United States Patent
Hyoudou et al.

(10) Patent No.: US 11,220,284 B2
(45) Date of Patent: Jan. 11, 2022

(54) STEERING WHEEL HEATER

(71) Applicant: PANASONIC INTELLECTUAL PROPERTY MANAGEMENT CO., LTD., Osaka (JP)

(72) Inventors: Takaaki Hyoudou, Kyoto (JP); Tomohisa Hayakawa, Shiga (JP); Kazumi Nagayama, Shiga (JP); Yuki Sonoda, Shiga (JP); Hiroshi Isono, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 121 days.

(21) Appl. No.: 16/742,116

(22) Filed: Jan. 14, 2020

(65) Prior Publication Data
US 2020/0239060 A1   Jul. 30, 2020

(30) Foreign Application Priority Data

Jan. 25, 2019 (JP) .............................. JP2019-011020
Mar. 15, 2019 (JP) .............................. JP2019-049091
Aug. 6, 2019 (JP) .............................. JP2019-144383

(51) Int. Cl.
*B62D 1/04* (2006.01)
*H05B 3/34* (2006.01)
*B62D 1/06* (2006.01)

(52) U.S. Cl.
CPC .............. *B62D 1/065* (2013.01); *H05B 3/34* (2013.01)

(58) Field of Classification Search
CPC ............. B62D 1/06; B62D 1/065; H05B 3/34
See application file for complete search history.

(56) References Cited

U.S. PATENT DOCUMENTS

| | | | | |
|---|---|---|---|---|
| 1,125,889 A | * | 1/1915 | Smith | B62D 1/065 219/526 |
| 6,414,270 B1 | * | 7/2002 | Sugiyama | B62D 1/065 219/204 |
| 7,244,914 B2 | * | 7/2007 | Yoneyama | H05B 3/34 219/202 |
| 8,278,602 B2 | * | 10/2012 | Yoneyama | H05B 3/34 219/204 |

(Continued)

FOREIGN PATENT DOCUMENTS

| | | |
|---|---|---|
| JP | 2003-297532 | 10/2003 |
| JP | 2011-121477 | 6/2011 |

(Continued)

OTHER PUBLICATIONS

Japanese Office Action dated Sep. 1, 2020 issued in Japanese patent application No. 2019-144383 and corresponding English translation.

*Primary Examiner* — Adam D Rogers
(74) *Attorney, Agent, or Firm* — Greenblum & Bernstein, P.L.C.

(57) ABSTRACT

A steering wheel heater includes: a base material that is wound around a steering wheel; a heater wire that generates heat by an electric current flowing through the heater wire; and a sewing thread that is used to sew the heater wire to one surface of the base material. A plurality of through holes that have a diameter smaller than a sewing pitch of stitches of the sewing thread used to sew the heater wire are formed in the base material.

11 Claims, 17 Drawing Sheets

(56) References Cited

U.S. PATENT DOCUMENTS

| | | | | |
|---|---|---|---|---|
| 8,450,662 | B2* | 5/2013 | Yoneyama | H05B 3/34 |
| | | | | 219/545 |
| 8,946,598 | B2* | 2/2015 | Hasegawa | B62D 1/065 |
| | | | | 219/204 |
| 9,810,727 | B2* | 11/2017 | Kandler | G01L 1/26 |
| 10,081,383 | B2* | 9/2018 | Seki | B62D 1/06 |
| 10,252,741 | B2* | 4/2019 | Okazaki | B62D 1/06 |
| 2003/0213797 | A1 | 11/2003 | Yoneyama et al. | |
| 2007/0246456 | A1 | 10/2007 | Yoneyama et al. | |
| 2015/0034622 | A1* | 2/2015 | Sasaki | B62D 1/065 |
| | | | | 219/204 |
| 2016/0009310 | A1 | 1/2016 | Seki et al. | |
| 2017/0210408 | A1 | 7/2017 | Okazaki et al. | |
| 2019/0389489 | A1* | 12/2019 | Okazaki | G01V 3/08 |
| 2021/0036438 | A1* | 2/2021 | Yamashita | H01R 4/30 |

FOREIGN PATENT DOCUMENTS

| | | |
|---|---|---|
| JP | 2016-016790 | 2/2016 |
| JP | 2017-216240 | 12/2017 |
| WO | 2016/009584 | 1/2016 |

\* cited by examiner

Circumferential direction

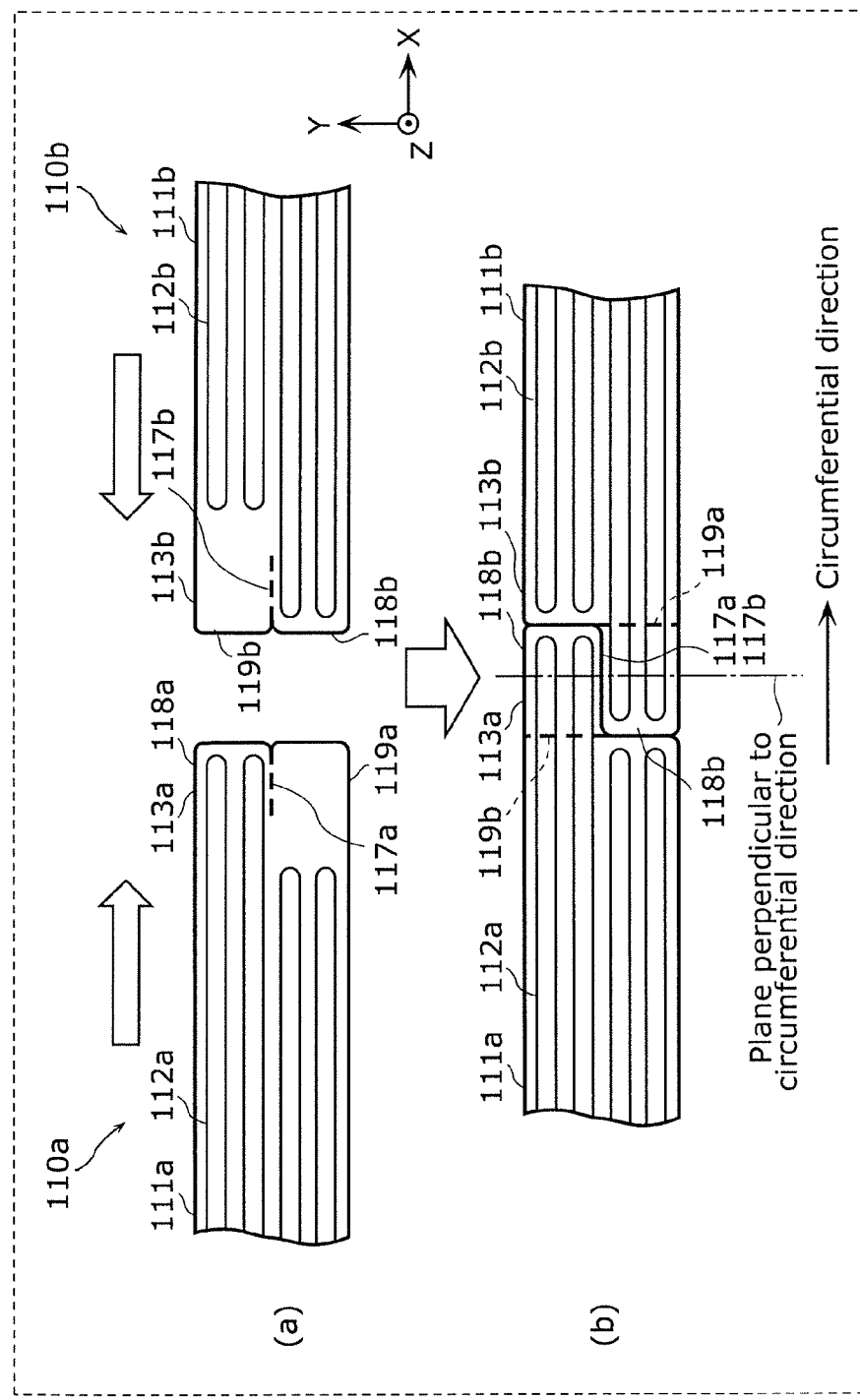

FIG. 16
Before electrode unit is wound around rim
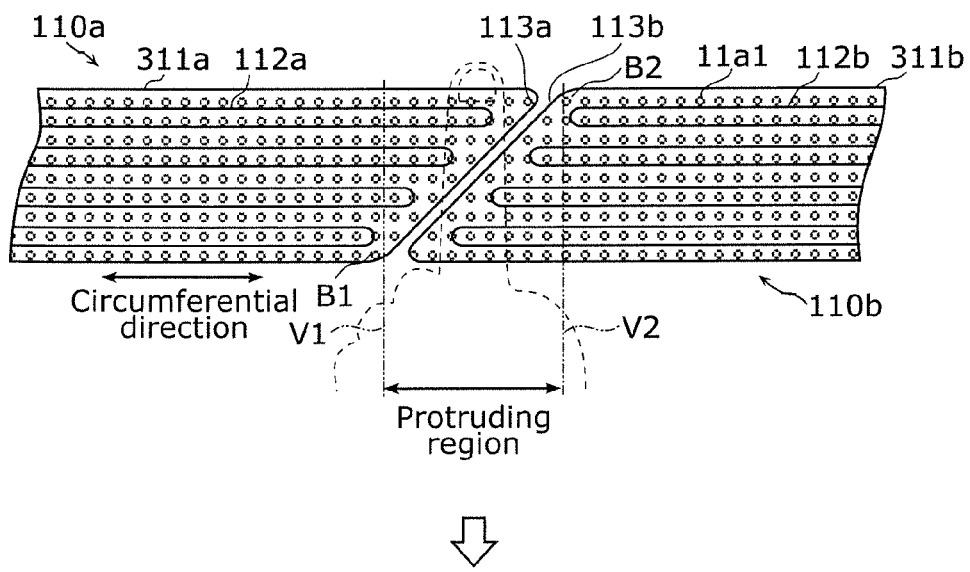
After electrode unit is wound around rim
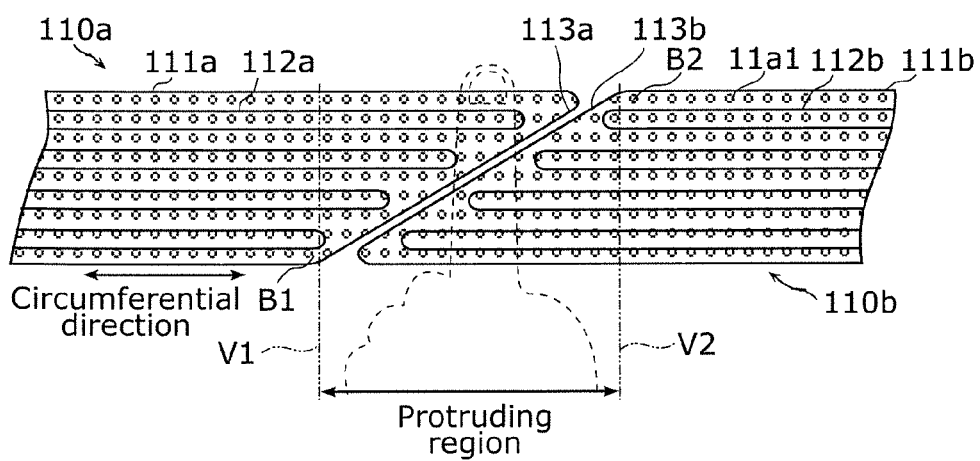

STEERING WHEEL HEATER

CROSS REFERENCE TO RELATED APPLICATIONS

The present application is based on and claims priority of Japanese Patent Application No. 2019-011020 filed on Jan. 25, 2019, Japanese Patent Application No. 2019-049091 filed on Mar. 15, 2019, and Japanese Patent Application No. 2019-144383 filed on Aug. 6, 2019.

FIELD

The present disclosure relates to a steering wheel heater that is wound around, for example, a steering wheel for vehicles.

BACKGROUND

Conventionally, a heater device that includes a base material made of a foamed urethane resin and a cord-shaped heater provided on the base material has been proposed (see, for example, Patent Literature 1 (PTL 1)). The heater device is provided in the rim of a steering wheel.

CITATION LIST

Patent Literatures

[PTL 1] Japanese Unexamined Patent Application Publication No. 2011-121477
[PTL 2] Japanese Unexamined Patent Application Publication No. 2017-216240

SUMMARY

The heater device disclosed in PTL 1 and the conductive heater disclosed in PTL 2 still have room for improvement.

Accordingly, the present disclosure provides a steering wheel heater capable of improving upon the above related art.

A steering wheel heater according to an aspect of the present disclosure includes: a base material that is wound around a steering wheel; a heater wire that generates heat by an electric current flowing through the heater wire; and a sewing thread that is used to sew the heater wire to one surface of the base material, wherein a plurality of through holes that have a diameter smaller than a sewing pitch of stitches of the sewing thread used to sew the heater wire are formed in the base material.

Generic or specific aspects of the present disclosure may be implemented by a system, a method, an integrated circuit, a computer program or a computer readable recording medium such as a CD-ROM, or may be implemented by any combination of a system, a method, an integrated circuit, a computer program and a recording medium. Also, the recording medium may be a non-transitory recording medium.

With the steering wheel heater according to the present disclosure, it is possible to improve upon the above related art.

BRIEF DESCRIPTION OF DRAWINGS

These and other advantages and features of the present disclosure will become apparent from the description given below thereof taken in conjunction with the accompanying drawings that illustrate a specific embodiment of the present disclosure.

FIG. 14 is a diagram showing an example of a leading end portion of a first base material and a leading end portion of a second base material according to Variation 2 of Embodiment 2.

FIG. 16 is a diagram showing the states of an electrode unit according to Embodiment 3 before and after the electrode unit is wound around a rim.

DESCRIPTION OF EMBODIMENTS

Figure 1:
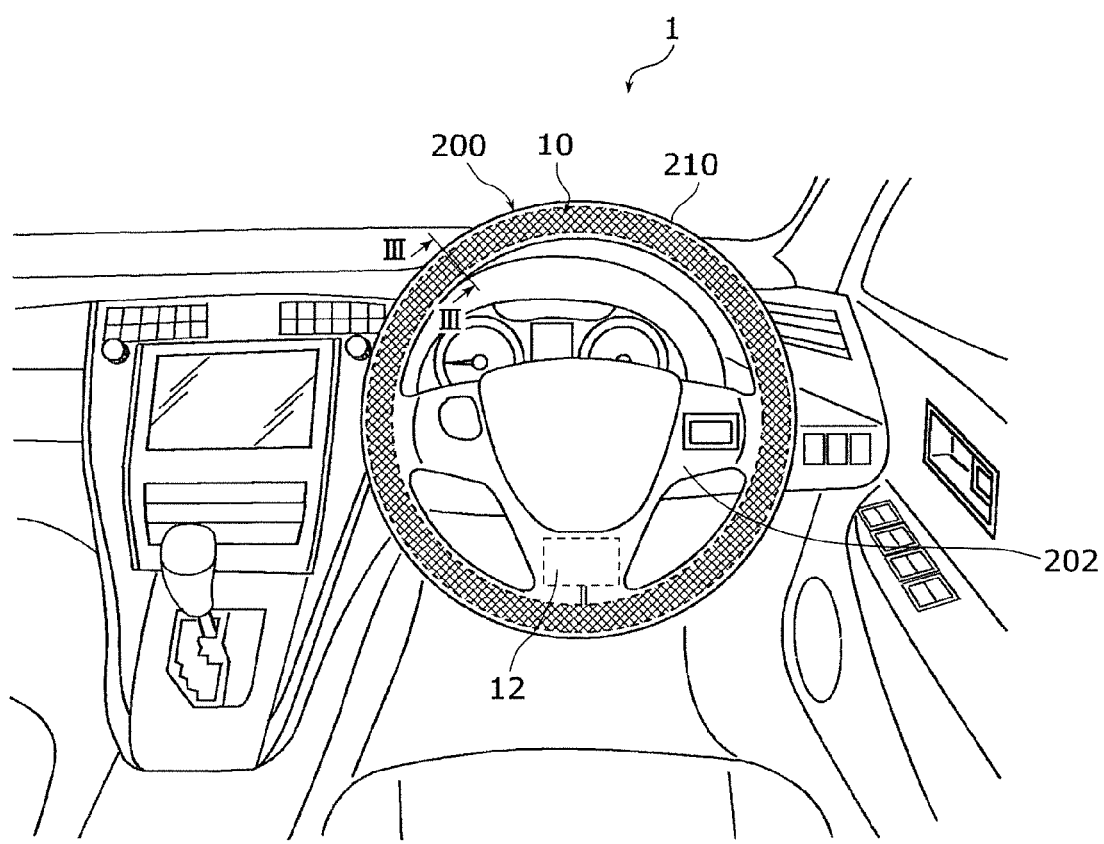
FIG. 1 is a diagram showing an example of a vehicle cabin in which a grip sensor according to Embodiment 1 is installed.

In the conventional heater device, because the polymeric foam, such as foamed urethane resin, used to form the base material is soft, when a person holds the steering wheel, he/she may feel discomfort. To address this, a configuration may be conceived in which a non-woven fabric that has an appropriate hardness and is inexpensive is used as a base material, and a heater wire is sewed to the base material. In this case, when the base material to which the heater wire has been sewn is wound around a steering wheel, due to the difference between the inner circumferential length of the steering wheel and the outer circumferential length of the steering wheel, on the inner circumferential side of the steering wheel, wrinkles are likely to be formed in the base material. When wrinkles are formed in the base material, the heater wire provided on the inner circumferential side of the steering wheel may protrude from the surface of the base material, and the heater wire may be disposed at a position different from the desired position. For this reason, the heater wire may be short-circuited, or the outer appearance may deteriorate. In contrast, a configuration may be used in which the base material is wound around the steering wheel by stretching the base material on the outer circumferential side of the steering wheel so as to prevent wrinkles to be formed in the base material on the inner circumferential side of the steering wheel. However, if the base material is hard, a problem arises in that it is difficult to stretch the base material on the outer circumferential side of the steering wheel.

In view of the above, a steering wheel heater according to an aspect of the present disclosure includes: a base material that is wound around a steering wheel; a heater wire that generates heat by an electric current flowing through the heater wire; and a sewing thread that is used to sew the heater wire to one surface of the base material, wherein a plurality of through holes that have a diameter smaller than a sewing pitch of stitches of the sewing thread used to sew the heater wire are formed in the base material.

Even when a material harder than that of a conventional base material is used as the base material, by forming a plurality of through holes in the base material, the base material can be easily stretched. That is, the base material is easily stretched on the outer circumferential side of the steering wheel. Furthermore, on the inner circumferential side of the steering wheel, the plurality of through holes can also absorb wrinkles formed in the base material.

Also, the diameter of the through holes is smaller than the sewing pitch used when sewing the heater wire, and thus the possibility of occurrence of a skipped stitch caused by the sewing-machine needle fitting into a through hole during sewing can be suppressed.

Accordingly, by improving the elasticity of the base material, the occurrence of wrinkles in the base material on the inner circumferential side of the steering wheel can be suppressed. As a result, with the steering wheel heater, it is possible to reduce short-circuiting of the heater wire, deterioration of the outer appearance, and the like. Furthermore, the steering wheel heater can be easily wound around the steering wheel by a worker, and thus workability is improved.

In a steering wheel heater according to another aspect of the present disclosure, in a state in which the base material is wound around the steering wheel, the plurality of through holes of the base material on an outer circumferential side of the steering wheel are greater in number than the plurality of through holes of the base material on an inner circumferential side of the steering wheel.

With this configuration, the base material on the outer circumferential side of the steering wheel is more easily stretched than the base material on inner circumferential side of the steering wheel. For this reason, the steering wheel heater can be easily wound around the steering wheel by a worker, and thus workability is further improved.

Also, the number of through holes formed on the inner circumferential side of the steering wheel whose circumferential length is shorter is reduced relative to the number of through holes formed on the outer circumferential side of the steering wheel, and thus it is unnecessary to form unnecessary holes on the base material. Accordingly, it is possible to suppress a reduction in the base material strength.

In a steering wheel heater according to another aspect of the present disclosure, in a state in which the base material is wound around the steering wheel, a first number density of the through holes per unit area of the base material on an outer circumferential side of the steering wheel is larger than a second number density of the through holes per unit area of the base material on an inner circumferential side of the steering wheel.

In this case as well, the same advantageous effects as those described above can be obtained.

In a steering wheel heater according to another aspect of the present disclosure, in a state in which the base material is wound around the steering wheel, the plurality of through holes of the base material gradually decrease from an outer circumferential side of the steering wheel toward an inner circumferential side of the steering wheel.

With this configuration, the stretch rate of the base material is reduced from the outer circumferential side of the steering wheel toward the inner circumferential side of the steering wheel according to the circumferential length of the steering wheel that decreases from the outer circumferential side of the steering wheel toward the inner circumferential side of the steering wheel. For this reason, the base material can easily conform to the shape of the steering wheel. Accordingly, with the steering wheel heater, the occurrence of wrinkles in the base material on the inner circumferential side of the steering wheel can be further suppressed.

In a steering wheel heater according to another aspect of the present disclosure, in a state in which the base material is wound around the steering wheel, in the base material, a number density of the through holes per unit area of the base material gradually decreases from the first number density to the second number density from the outer circumferential side of the steering wheel toward the inner circumferential side of the steering wheel.

In this case as well, the same advantageous effects as those described above can be obtained.

In a steering wheel heater according to another aspect of the present disclosure, a pitch between two adjacent through holes of the plurality of through holes is different from the sewing pitch.

For example, if the pitch between two adjacent through holes of the plurality of through holes is the same as the sewing pitch, when the heater wire is sewed to one surface of the base material using a sewing thread, most of a plurality of stitches may overlap the plurality of through holes. In this case, the heater wire cannot be sewed to the surface of the base material using the sewing thread, and the heater wire may be disposed at a position different from the desired position.

However, with the steering wheel heater of the present disclosure, the pitch between two adjacent through holes is different from the sewing pitch. Accordingly, when the heater wire is sewed to one surface of the base material using a sewing thread, most of a plurality of stitches are unlikely to overlap the plurality of through holes, or in other words, it is possible to suppress skipped stitches formed when the sewing-machine needle fits into through holes during sewing. For this reason, the heater wire can be more reliably sewed to one surface of the base material using a sewing thread. As a result, the heater wire is unlikely to protrude from the surface of the base material, and thus short-circuiting of the heater wire and deterioration of the outer appearance can be suppressed.

A steering wheel heater according to another aspect of the present disclosure further includes a control circuit that is electrically connected to one end of the heater wire, wherein the control circuit is electrically connected to the heater wire, and detects contact between a human body and the steering wheel by using the heater wire as a sensor electrode.

As described above, by electrically connecting the control circuit to the heater wire, a contact or grip on the steering wheel can be detected. For this reason, it is unnecessary to additionally provide another sensor electrode that is different from the heater wire in the steering wheel heater, and thus an increase in the number of steps of assembling the steering wheel heater and an increase in the number of components of the steering wheel heater can be suppressed. As a result, with the steering wheel heater, it is possible to suppress an increase in the production cost.

The inventors of the present disclosure found that the conductive heater, or in other words, the steering wheel heater disclosed in PTL 2 have the following problems.

The conductive heater disclosed in PTL 2 includes two heaters/sensors. The two heaters/sensors are wound around the rim of a steering wheel. At this time, the two heaters/sensors are disposed in close proximity to each other. However, a dead zone in which the heaters/sensors are not present is formed between the two heaters/sensors. In the dead zone, the sensitivity to contact or grip by a human hand is low. Also, with the conductive heater disclosed in PTL 2, the dead zone is formed in the area that is easily touched by a human hand. As a result, despite the fact that the steering wheel is being touched by a human hand, because the portion of the steering wheel being touched by the hand is the dead zone, it may be determined that the steering wheel is not being touched by the hand.

In order to address the above problem, in a steering wheel heater according to another aspect of the present disclosure, the base material is attached to a rim of the steering wheel to extend in a circumferential direction of the rim, two end portions of the base material in the circumferential direction of the rim oppose each other, and the sensor electrode is disposed on the base material to intersect a plane that is perpendicular to the circumferential direction of the rim and that crosses the two end portions.

For example, when a human finger or the like lightly touches a portion of the rim in which two end portions of the base material are disposed, the range that can be touched by the finger or the like is a very small range of the rim, and is often a range that extends along a line of intersection between a plane perpendicular to the circumferential direction of the rim at that portion and the rim surface. With the steering wheel heater according to one aspect of the present disclosure, the sensor electrode is disposed to intersect the plane. Accordingly, as described above, the possibility that the sensor electrode is disposed in the range that can be touched by a finger or the like can be increased. As a result, the detection sensitivity of the steering wheel heater to a contact of a hand, specifically, the detection sensitivity in the portion in which two end portions are disposed opposing to each other can be improved.

Also, in a steering wheel heater according to another aspect of the present disclosure, the base material includes a first base material and a second base material, the sensor electrode includes a first sensor electrode that is disposed in the first base material and a second sensor electrode that is disposed in the second base material, one of the two end portions is an end portion of the first base material, and the other of the two end portions is an end portion of the second base material.

With this configuration, in each of the portion of the rim in which the first sensor electrode is disposed and the portion of the rim in which the second sensor electrode is disposed, a contact or grip on the rim by a human hand can be detected appropriately.

Also, in a steering wheel heater according to another aspect of the present disclosure, respective edges of the two end portions are inclined relative to the plane.

With this configuration, by simply forming two end portions of the base material to have inclined edges, the sensor electrode can be easily disposed on the base material so as to intersect the above-described plane perpendicular to the circumferential direction. Accordingly, a steering wheel heater with high detection sensitivity can be easily produced. Also, the structure of the end portions is not complicated, and thus the end portions can be easily brought into proximity and oppose each other when attaching the base material to the rim.

Also, in a steering wheel heater according to another aspect of the present disclosure, each of the two end portions may have a protrusion and a recess, and the protrusion and the recess of one of the two end portions and the recess and the protrusion of the other of the two end portions may be fitted in the circumferential direction. For example, respective edges of the two end portions may be crank-shaped. Alternatively, each of the two end portions may be fork-shaped and may have a plurality of protrusions and a plurality of recesses.

With this configuration, the protrusions and the recesses of the end portions are fitted, and thus the end portions can be positioned more accurately. As a result, the sensor electrode can be disposed to more appropriately intersect the above-described plane perpendicular to the circumferential direction.

Also, in a steering wheel heater according to another aspect of the present disclosure, each of the two end portions may have a slit extending in the circumferential direction, and may be divided by the slit into an electrode region in which a portion of the sensor electrode is disposed and an electrodeless region in which the sensor electrode is not disposed, and when the base material is attached to the rim, one of the two end portions may be inserted into the slit of the other of the two end portions that is different from the one of the two end portions, and the electrode region of one of the two end portions may be overlaid on a surface side of the rim relative to the electrodeless region of the other of the two end portions.

With this configuration, the sensor electrode can be easily disposed to intersect the above-described plane perpendicular to the circumferential direction, without forming two end portions of the base material to have an inclined edge or to have a protrusion and a recess.

Also, in a steering wheel heater according to another aspect of the present disclosure, a circuit that causes the electric current to flow through the heater wire may cause electric currents in opposite directions to each other to flow through a first linear portion and a second linear portion, the first linear portion being a portion of the heater wire and disposed in one of the two end portions, and the second linear portion being another portion of the heater wire, disposed adjacent and substantially parallel to the first linear portion, and disposed in the other of the two end portions.

With this configuration, electromagnetic fields generated as a result of the electric currents respectively flowing through the first linear portion and the second linear portion are cancelled, and thus the occurrence of noise can be suppressed.

Also, a steering wheel heater may include: a base material that is attached to a rim of a steering wheel to extend in a circumferential direction of the rim; and a sensor electrode that is disposed on the base material, two end portions of the base material in the circumferential direction of the rim may oppose each other, the sensor electrode may be disposed on the base material to intersect a plane that is perpendicular to the circumferential direction of the rim and that crosses the two end portions, and the sensor electrode may generate heat by an electric current flowing through the sensor electrode, and heat the rim.

Accordingly, as described above, the possibility that the sensor electrode is disposed in the range that can be touched by a finger or the like can be increased. As a result, the detection sensitivity of the steering wheel heater to a contact of a hand, specifically, the detection sensitivity in the portion in which two end portions are disposed opposing to each other can be improved.

Hereinafter, a specific description of embodiments will be given with reference to the drawings.

The embodiments described below show generic or specific examples of the present disclosure. The numerical values, shapes, materials, structural elements, the arrangement and connection of the structural elements, steps, the order of the steps, and the like shown in the embodiments given below are merely examples, and therefore are not intended to limit the scope of the present disclosure. Also, among the structural elements described in the embodiments given below, structural elements not recited in any one of the independent claims are described as arbitrary structural elements.

In addition, the diagrams are schematic representations, and thus are not necessarily true to scale. Also, in the diagrams, structural elements that are the same are given the same reference numerals. Also, in the embodiments given below, phrases such as "substantially T shape" are used. For example, the phrase "substantially the same" means not only completely the same, but also substantially the same, or in other words, the phrase encompasses, for example, an error of about several percent. Also, the phrase "substantially the same" means the same within a range in which the effects of the present disclosure can be obtained. The same applies to other phrases that use the word "substantially".

Embodiment 1

FIG. 1 is a diagram showing an example of a vehicle cabin of vehicle 1 in which grip sensor 10 according to Embodiment 1 is installed.

As shown in FIG. 1, vehicle 1 includes steering wheel 200, a speaker, and a display device such as a liquid crystal display. The speaker and the display device are configured as, for example, an alert device.

Steering wheel 200 applies a steering angle to the wheels of vehicle 1. Steering wheel 200 includes rim 210, substantially T-shaped spoke 202 that is unitarily formed with the inner circumferential surface of rim 210, and a horn switch cover that covers a horn switch (not shown) provided at the center portion of spoke 202.

Figure 3:
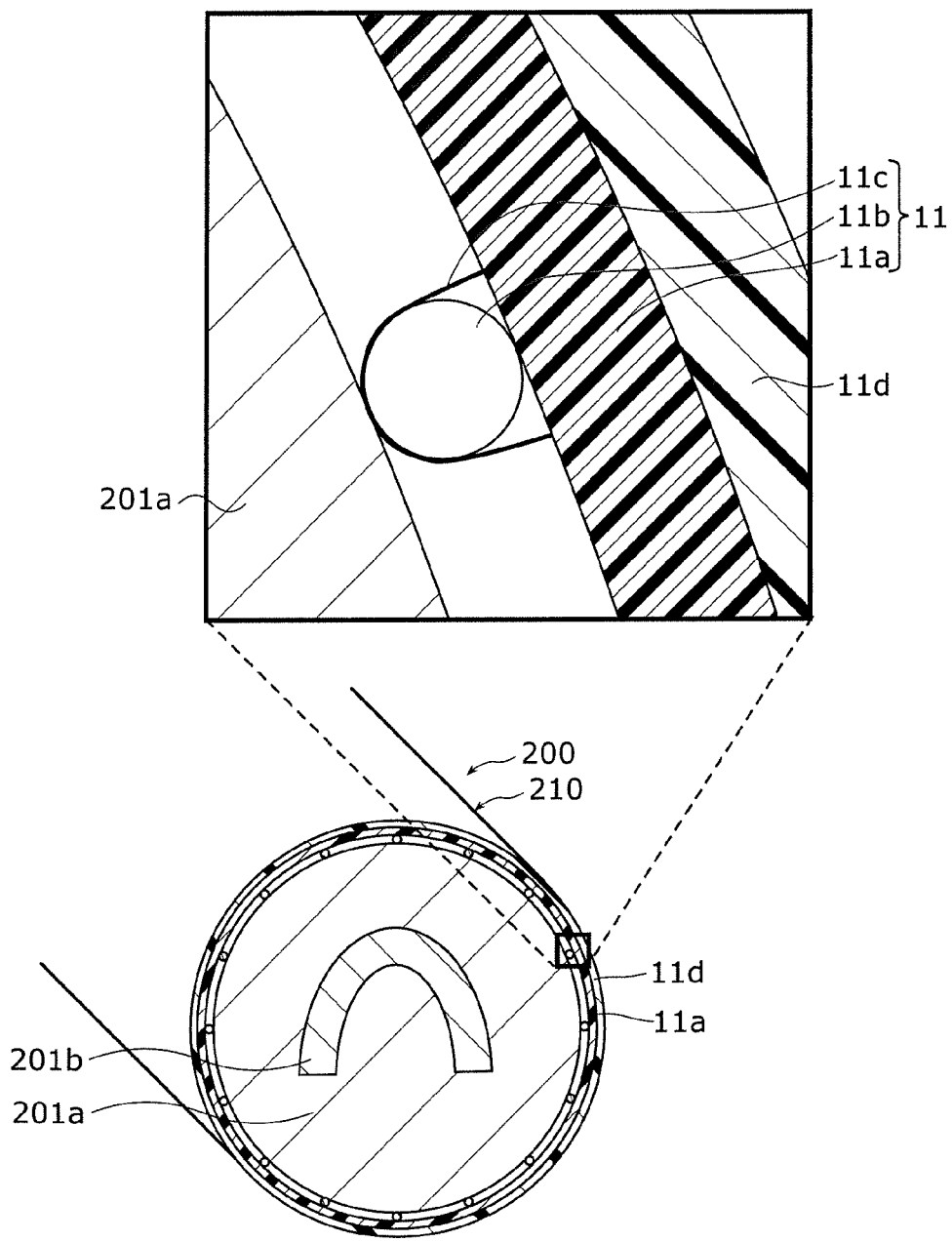
FIG. 3 shows a cross sectional view showing a cross section of a rim around which a steering wheel heater of the grip sensor is wound, the cross section being taken along the line shown in FIG. 1, and a partially enlarged cross sectional view of the rim.

Rim 210 is a gripping portion that is held by a driver's hand, and has a ring shape. Rim 210 includes metal core 201b that is an annular core made of a metal and resin layer 201a that covers metal core 201b as shown in FIG. 3. Grip sensor 10 is wound around rim 210. Also, the outer circumference of grip sensor 10 is covered by surface layer 11d made of leather, wood, resin, or the like, as shown in FIG. 3.

Grip sensor 10 is a device that detects a grip of driver's hand on rim 210, and is provided in rim 210 in vehicle 1. Grip sensor 10 is a capacitive proximity sensor that detects the presence of a person in vehicle 1 that includes steering wheel 200. Grip sensor 10 may detect a contact or grip on rim 210 by a hand of a person as information relating to the person.

Figure 2:
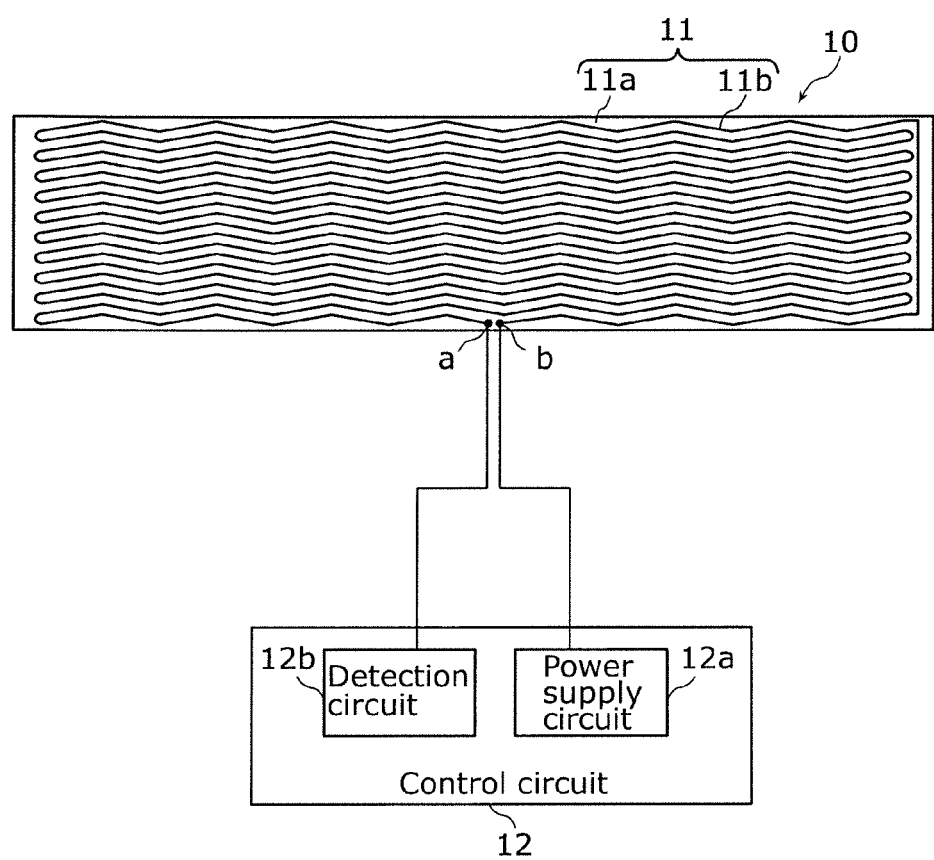
FIG. 2 is a front view of the grip sensor according to Embodiment 1.

FIG. 2 is a front view of grip sensor 10 according to Embodiment 1. As shown in FIG. 2, specifically, grip sensor 10 includes steering wheel heater 11 that is embedded in rim 210 and control circuit 12 that detects a grip based on a signal from steering wheel heater 11. FIG. 3 shows a cross sectional view showing a cross section of rim 210 around which steering wheel heater 11 of grip sensor 10 is wound, the cross section being taken along the line III-III shown in FIG. 1, and a partially enlarged cross sectional view of rim 210.

As shown in FIGS. 2 and 3, steering wheel heater 11 includes base material 11a, heater wire lib, and sewing thread 11c.

Base material 11a is a non-woven fabric that is in the form of an elongated sheet and is made of a material that has elasticity, flexibility, and ductility. For example, base material 11a is made of a synthetic resin such as polyethylene (PE) or polyethylene terephthalate (PET). A polymeric foam such as a foamed urethane is not used in base material 11a of the present embodiment. Base material 11a is formed according to the shape and size of rim 210.

Figure 4:
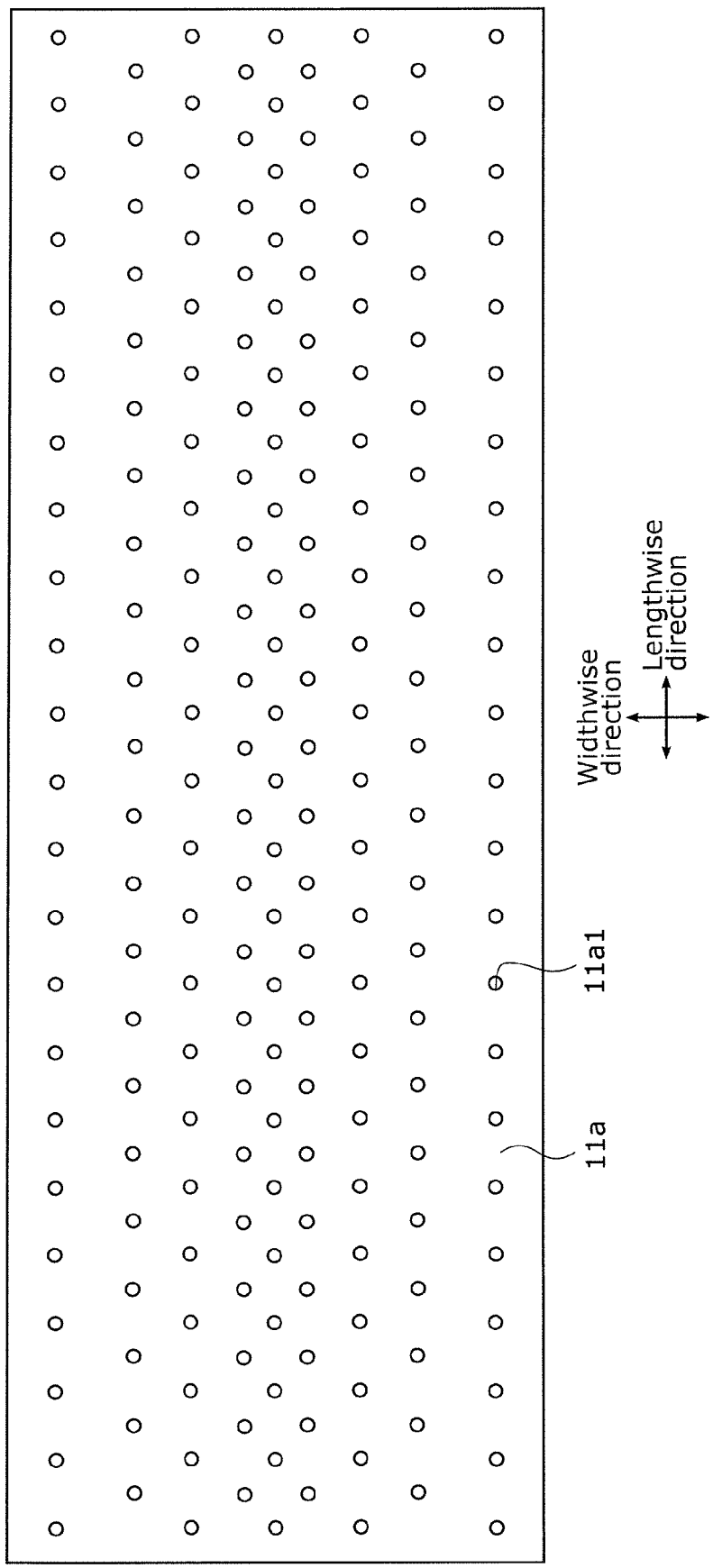
FIG. 4 is a front view of a base material included in the steering wheel heater of the grip sensor according to Embodiment 1.

FIG. 4 is a front view of base material 11a of steering wheel heater 11 of grip sensor 10 according to Embodiment 1. As shown in FIG. 4, a plurality of through holes 11a1 are formed in base material 11a. In a state in which base material 11a is wound around steering wheel 200, the number of through holes 11a1 formed in base material 11a on the outer circumferential side of rim 210 of steering wheel 200 (hereinafter also referred to as the outer circumferential side of steering wheel 200) is greater than the number of through holes 11a1 formed in base material 11a on the inner circumferential side of rim 210 of steering wheel 200 (hereinafter also referred to as the inner circumferential side of steering wheel 200). In other words, in a state in which base material 11a is wound around steering wheel 200, a first number density of through holes 11a1 per unit area of base material 11a on the outer circumferential side of steering wheel 200 is larger than a second number density of through holes 11a1 per unit area of base material 11a on the inner circumferential side of steering wheel 200. For this reason, in a portion of base material 11a that comes into contact with the outer circumferential side of rim 210, or in other words, in a center portion of base material 11a in the widthwise direction (hereinafter referred to as the center portion of base material 11a), the number of through holes 11a1 per unit area is greater than that in a portion of base material 11a that comes into contact with the inner circumferential side of rim 210, or in other words, in edge portions of base material 11a in the widthwise direction (hereinafter referred to as the edge portions of base material 11a). In the edge portions of base material 11a, the number of through holes 11a1 per unit area may be 0. In this case, there is no through hole 11a1 in the edge portions of base material 11a.

Also, the number of through holes 11a1 of base material 11a decreases gradually from the outer circumferential side of steering wheel 200 toward the inner circumferential side of steering wheel 200. In other words, in a state in which base material 11a is wound around steering wheel 200, in base material 11a, the number density of the through holes per unit area of the base material gradually decreases from the first number density to the second number density from the outer circumferential side of steering wheel 200 toward steering wheel 200. Accordingly, the density of through holes 11a1 decreases gradually from the center portion of base material 11a toward the edge portions of base material 11a.

In the present embodiment, the number density of through holes 11a1 formed in the center portion of base material 11a is greater than the number density of through holes 11a1 that are formed in each edge portion of base material 11a. However, in the case where an edge portion of base material 11a is provided on the outer circumferential side of rim 210, the number density of through holes 11a1 in the edge portion is increased. Accordingly, the number density of through holes 11a1 formed in the center portion of base material 11a is not necessarily greater than that in each edge portion of base material 11a.

Also, in the present embodiment, the number density of through holes 11a1 formed in base material 11a varies depending on the location in base material 11a. However, the number density of through holes 11a1 in base material 11a may be uniform throughout base material 11a. That is, a plurality of through holes 11a1 may be spaced equidistantly in base material 11a.

Figure 5:
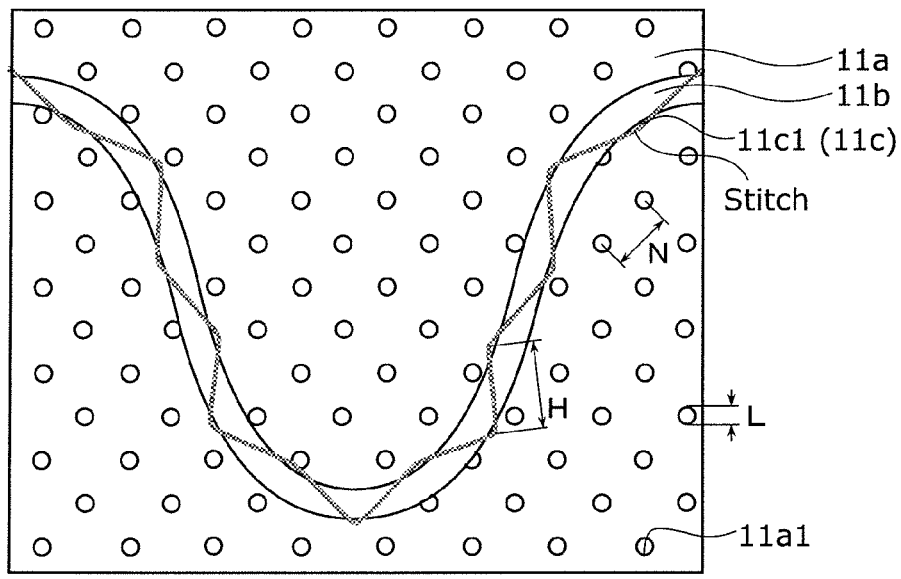
FIG. 5 is a partially enlarged front view of the steering wheel heater of the grip sensor according to Embodiment 1.

FIG. 5 is a partially enlarged front view of steering wheel heater 11 of grip sensor 10 according to Embodiment 1. As shown in FIG. 5, pitch N between two adjacent through holes 11a1 of the plurality of through holes 11a1 is different from sewing pitch H.

Here, pitch N between two adjacent through holes 11a1 is the distance between the center of the opening face of one through hole 11a1 and the center of the opening face of the other through hole 11a1. Also, the number density of through holes 11a1 varies depending on the location in base material 11a, and thus all of pitch N between two adjacent through holes 11a1 and sewing pitch H are preferably all different. Alternatively, it is sufficient that only minimum pitch N and sewing pitch H are different.

As used herein, sewing pitch H refers to the distance between a first stitch formed on base material 11a by using sewing thread 11c and a second stitch formed on base material 11a by using sewing thread 11c next to the first stitch.

Also, opening diameter L of through hole 11a1 (also referred to as the diameter of through hole 11a1) is smaller than sewing pitch H. If opening diameter L of through hole 11a1 is larger than sewing pitch H, through hole 11a1 and a stitch on base material 11a may overlap and cause an skipped stitch, and thus it is difficult to sew heater wire 11b to base material 11a by using sewing thread 11c.

Also, base material 11a holds heater wire 11b on a surface of base material 11a. As used herein, the surface refers to the side of base material 11a on which heater wire 11b is held. Base material 11a is attached to rim 210. More specifically, base material 11a is attached to rim 210 such that heater wire 11b is interposed between base material 11a and rim 210. The surface is an example of one surface of base material 11a.

Heater wire 11b is made of a conductive wire, and one end (namely end a) of heater wire 11b and the other end (namely, end b) of heater wire 11b are connected to control circuit 12. Here, heater wire 11b is disposed in a zigzag pattern on the surface of base material 11a. Specifically, heater wire 11b is, for example, a metal wire such as a copper wire, and is sewed to the surface of base material 11a by using sewing thread 11c such that a zigzag pattern is formed. As used herein, the expression "heater wire 1ib is sewed to the surface of base material 11a by using sewing thread 11c" refers to a state in which heater wire 11b is held on base material 11a with sewing thread 11c sewed to base material 11a.

Heater wire 11b according to the present embodiment is sewed to the surface of base material 11a by using sewing thread 11c. However, heater wire 1ib may be fixed to base material 11a by thermal compression bonding or the like. Furthermore, heater wire 11b may have a planar structure of a conductor or resistor. Also, heater wire 1ib is made of a conductive wire, but may be in any form as long as a conductive member is used. That is, in grip sensor 10, heater wire 11b also functions as a sensor electrode, and thus in this case, heater wire 11b is not necessarily formed linearly, and may be formed in a planar shape.

Figure 6:
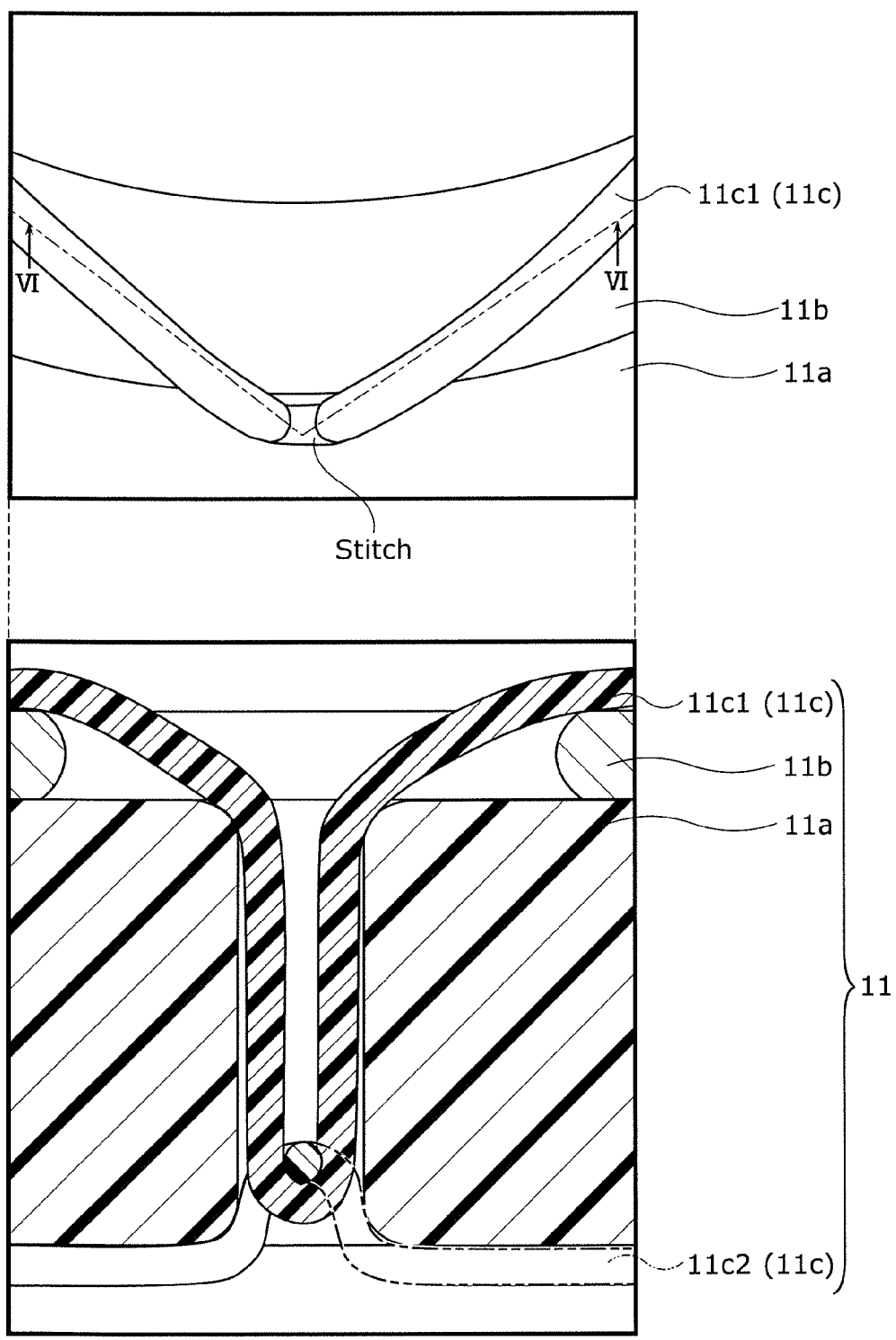
FIG. 6 shows a partially enlarged top view of the steering wheel heater and a cross sectional view of the steering wheel heater taken along the dash-dotted line VI-VI shown in FIG. 6.

FIG. 6 shows a partially enlarged top view of steering wheel heater 11, and a cross sectional view of steering wheel heater 11 taken along the dash-dotted line VI-VI shown in FIG. 6. As shown in FIG. 6, sewing thread 11c is sewed to base material 11a in the extension direction of heater wire 11b so as to fix heater wire 11b to base material 11a. Specifically, sewing thread 11c includes upper thread 11c1 and lower thread 11c2. Upper thread 11c1 is sewed to base material 11a so as to extend through base material 11a from the surface to the back surface of base material 11a, and lower thread 11c2 is sewed to base material 11a so as to extend through base material 11a from the back surface to the surface of base material 11a. Sewing thread 11c is sewed to base material 11a as a result of upper thread 11c1 and lower thread 11c2 being intertwined with each other. Sewing thread 11c may be any thread, and the material of sewing thread 11c is not limited to any particular material.

As shown in FIGS. 1 and 2, control circuit 12 is embedded in, for example, spoke 202. Control circuit 12 detects, based on a signal transmitted from heater wire 11b, whether or not rim 210 is touched by a hand, as well as the position touched by the hand. If a contact is not detected despite the fact that vehicle 1 is being driven, control circuit 12 may cause an alert device to alert the driver. The alert device such as, for example, a speaker may alert the driver by using an alert sound or voice. Also, the display device may display, for the driver, an alert message that prompts the driver to firmly hold steering wheel 200.

Control circuit 12 includes power supply circuit 12a and detection circuit 12b.

Power supply circuit 12a is electrically connected to end b that is the other end of heater wire 11b. Also, power supply circuit 12a heats heater wire 1ib by causing an electric current to flow through heater wire 11b. As a result, heater wire 11b can heat rim 210 of steering wheel 200. In control circuit 12, a connection to the ground is made via an inductor (not shown) midway in wiring that extends from end a of heater wire 11b to detection circuit 12b so as to cause an electric current to flow from power supply circuit 12a to heater wire 1ib.

Detection circuit 12b is electrically connected to end a that is one end of heater wire 1ib. Detection circuit 12b detects a contact or grip on rim 210 by a human hand by using heater wire 1*b*. That is, detection circuit 12*b* causes an alternating current to flow through heater wire 1*b*. Detection circuit 12*b* detects a change in the capacitance of heater wire 11*b* based on the current value of the electric current flowing through heater wire 1*b*. If a portion of rim 210 in which heater wire 1*b* is disposed is touched by a hand, the capacitance of heater wire 11*b* that corresponds to the touched portion varies. Control circuit 12 detects the contact on rim 210 by the hand based on a signal output from heater wire 1*b* according to the change in the capacitance. In this way, control circuit 12 can detect whether or not rim 210 in which heater wire 1*b* is disposed has been touched by a hand.

SUMMARY

As described above, with steering wheel heater 11 according to the present embodiment, by forming a plurality of through holes 11*a*1 in base material 11*a*, base material 11*a* can be easily stretched even when base material 11*a* is made of a material that is harder than conventional base material 11*a*. That is, the elasticity of base material 11*a* can be improved by forming a plurality of through holes 11*a*1. Also, in base material 11*a* wound around steering wheel 200, the outer circumference of steering wheel 200 and the inner circumference of steering wheel 200 have different circumferential lengths, and thus by reducing the number density of the plurality of through holes 11*a*1 from the outer circumferential side of steering wheel 200 toward the inner circumferential side of steering wheel 200, the stretch rate of base material 11*a* increases from the inner circumferential side of steering wheel 200 toward the outer circumferential side of steering wheel 200. For this reason, base material 11*a* can easily conform to the shape of steering wheel 200. Also, on the inner circumferential side of steering wheel 200, the plurality of through holes 11*a*1 can absorb wrinkles on base material 11*a*, and thus wrinkles are unlikely to be formed. Furthermore, the opening diameter of through holes 11*a*1 is smaller than the sewing pitch used to sew heater wire 11*b*. Accordingly, it is possible to suppress the possibility of occurrence of skipped stitches that are formed when the sewing-machine needle fits into through holes 11*a*1 during sewing.

As described above, with steering wheel heater 11 of the present embodiment, steering wheel heater 11 can be easily wound around steering wheel 200 by a worker, and thus workability is improved. Also, heater wire 11*b* is sewed to base material 11*a* by using sewing thread 11*c*, and thus heater wire 11*b* is unlikely to protrude from the surface of base material 11*a*. Accordingly, with steering wheel heater 11 according to the present embodiment, heater wire 11*b* is not easily short-circuited, and thus a good outer appearance can be maintained.

Embodiment 2

Unless otherwise stated, the configuration of steering wheel heater 100 according to the present embodiment is the same as that of Embodiment 1, and structural elements that are the same as those of Embodiment 1 are given the same reference numerals and a detailed description thereof will be omitted.

Figure 7:
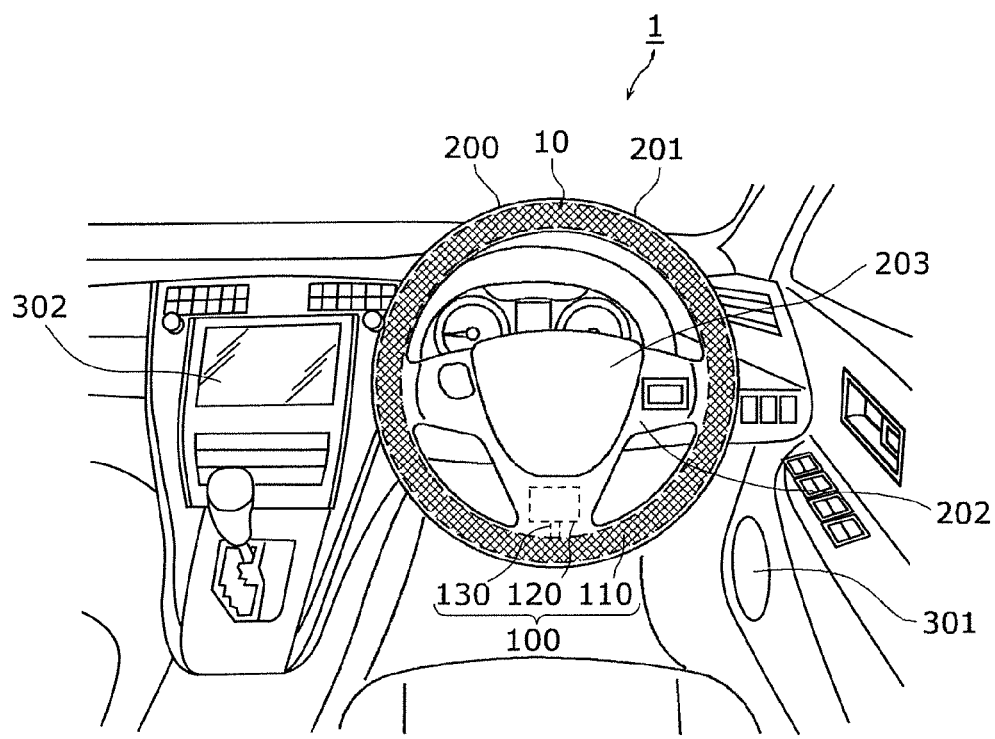
FIG. 7 is a diagram showing an example of a vehicle cabin in which a grip sensor according to Embodiment 2 is installed.

FIG. 7 is a diagram showing an example of a vehicle cabin of vehicle 1 in which grip sensor 10 according to the present embodiment is installed.

Vehicle 1 includes steering wheel 200, speaker 301, and display device 302 such as a liquid crystal display. Speaker 301 and display device 302 are configured as, for example, an alert device.

Steering wheel 200 is provided so as to steer vehicle 1. Steering wheel 200 includes ring-shaped rim 201, substantially T-shaped spoke 202 unitarily formed with the inner circumferential surface of rim 201, and horn switch cover 203 that covers a horn switch (not shown) provided at the center portion of spoke 202.

Grip sensor 10 is a sensor for detecting, for example, a grip or the like on rim 201 of steering wheel 200 by a hand of the driver of vehicle 1, and is provided in steering wheel 200 of vehicle 1 as shown in FIG. 7. Grip sensor 10 detects a contact on rim 201 by a hand including a grip on rim 201 by a hand. Specifically, steering wheel heater 100 of grip sensor 10 further includes electrode unit 110 embedded in rim 201 of steering wheel 200, detection circuit 120 for detecting a contact by a hand based on a signal from electrode unit 110, and harness 130 that electrically connects electrode unit 110 to detection circuit 120. Detection circuit 120 is embedded in, for example, spoke 202.

Electrode unit 110 includes at least one sensor electrode, which will be described later. In the sensor electrode, the capacitance varies according to whether or not the driver of vehicle 1 is touching rim 201 of steering wheel 200. Detection circuit 120 measures a value (for example, current value) corresponding to the capacitance of the sensor electrode, and detects a contact on rim 201 by the driver's hand based on the value. Then, if a contact is not detected despite the fact that vehicle 1 is being driven, detection circuit 120 causes an alert device to alert the driver. At this time, vehicle 1 may be driven automatically, or may be driven manually. For example, speaker 301 of the alert device may alert the driver by using an alert sound or voice. Display device 302 displays, for the driver, an alert message that prompts the driver to firmly hold steering wheel 200. With this configuration, it is possible to reduce traffic accidents.

Figure 8:
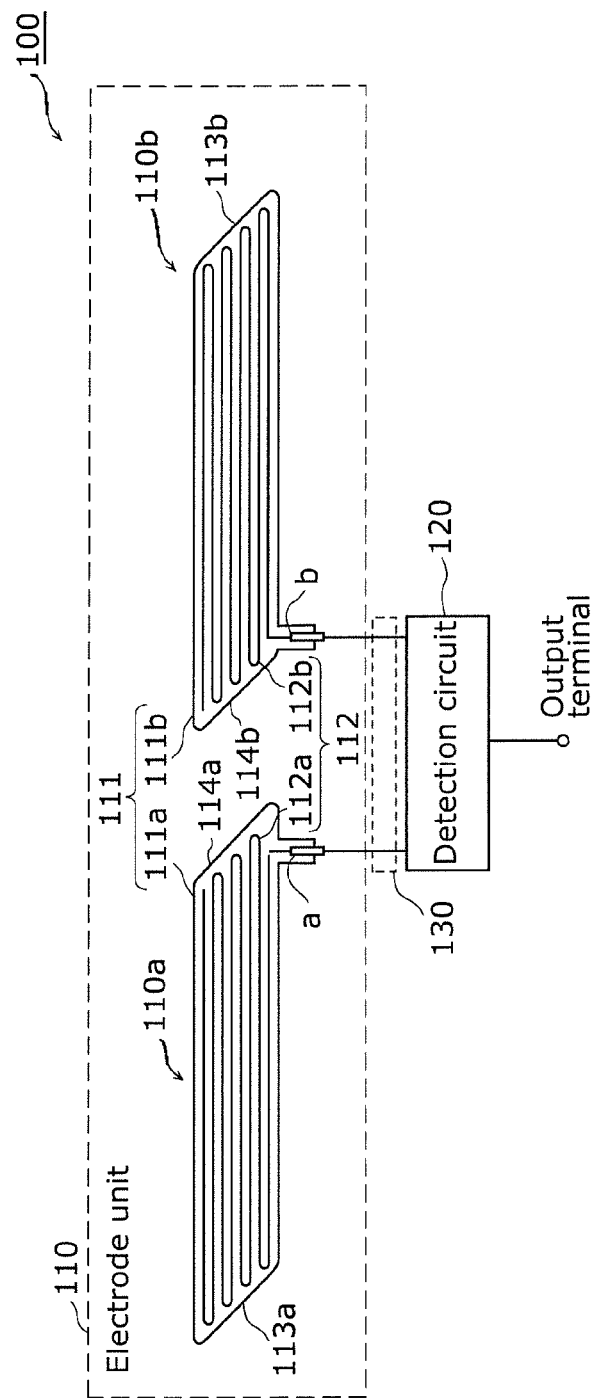
FIG. 8 is a diagram showing an example of a configuration of a steering wheel heater according to Embodiment 2.

FIG. 8 is a diagram showing an example of a configuration of steering wheel heater 100 according to the present embodiment.

As described above, steering wheel heater 100 includes electrode unit 110, detection circuit 120, and harness 130. Electrode unit 110 includes base material 111 and sensor electrode 112. Base material 111 is attached to rim 201 of steering wheel 200 so as to extend in the circumferential direction of rim 201. Sensor electrode 112 is disposed on base material 111.

Specifically, base material 111 includes first base material 111*a* and second base material 111*b*. First base material 111*a* and second base material 111*b* are made of, for example, a non-woven fabric, and formed in the shape of a sheet elongated in one direction. Furthermore, sensor electrode 112 includes first sensor electrode 112*a* disposed on first base material 111*a* and second sensor electrode 112*b* disposed on second base material 111*b*. That is, electrode unit 110 includes: first electrode unit 110*a* including first base material 111*a* and first sensor electrode 112*a*; and second electrode unit 110*b* including second base material 111*b* and second sensor electrode 112*b*. In the description given below, electrode unit 110 means either one or both of first electrode unit 110*a* and second electrode unit 110*b*. Likewise, base material 111 means either one or both of first base material 111*a* and second base material 111*b*, and sensor electrode 112 means either one or both of first sensor electrode 112*a* and second sensor electrode 112*b*.

First sensor electrode 112a and second sensor electrode 112b are configured as conductive wires. For example, first sensor electrode 112a and second sensor electrode 112b are metal wires such as copper wires, and they are respectively sewed to first base material 111a and second base material 111b so as to form a zigzag pattern. That is, first sensor electrode 112a is sewed to one surface of first base material 111a by being folded repeatedly at two end portions of first base material 111a in the lengthwise direction. Likewise, second sensor electrode 112b is sewed to one surface of second base material 111b by being folded repeatedly at two end portions of second base material 111b in the lengthwise direction. Also, end a of first sensor electrode 112a is disposed on one end side of first base material 111a in the lengthwise direction, and end b of second sensor electrode 112b is disposed on one end side of second base material 111b in the lengthwise direction. End a of first sensor electrode 112a and end b of second sensor electrode 112b are electrically connected to detection circuit 120.

An end portion of first base material 111a in the lengthwise direction in which end a of first sensor electrode 112a is disposed will be hereinafter referred to as base end portion 114a, and an end portion opposite to base end portion 114a in the lengthwise direction will be hereinafter referred to as leading end portion 113a. Likewise, an end portion of second base material 111b in the lengthwise direction in which end b of second sensor electrode 112b is disposed will be hereinafter referred to as base end portion 114b, and an end portion opposite to base end portion 114b in the lengthwise direction will be hereinafter referred to as leading end portion 113b.

Here, in the present embodiment, the surface and the back surface of first base material 111a and second base material 111b that are each configured in the shape of a sheet are formed in a substantially parallelogram. Specifically, the edges of two end portions of first base material 111a in the lengthwise direction, or in other words, the edge of leading end portion 113a and the edge of base end portion 114a are inclined relative to the widthwise direction of first base material 111a, rather than parallel to the widthwise direction of first base material 111a. Likewise, the edges of two end portions of second base material 111b in the lengthwise direction, or in other words, the edge of leading end portion 113b and the edge of base end portion 114b of second base material 111b are inclined relative to the widthwise direction of second base material 111b, rather than parallel to the widthwise direction of second base material 111b. As used herein, the lengthwise direction and the widthwise direction of base material 111 are two directions that are perpendicular to each other along one surface of base material 111.

Also, first sensor electrode 112a is disposed such that it does not extend to the edge of leading end portion 113a and the edge of base end portion 114a of first base material 111a, and thus first sensor electrode 112a is spaced apart from leading end portion 113a and base end portion 114a of first base material 111a. Likewise, second sensor electrode 112b is disposed such that it does not extend to the edge of leading end portion 113b and the edge of base end portion 114b of second base material 111b, and thus second sensor electrode 112b is spaced apart from leading end portion 113b and base end portion 114b of second base material 111b. As described above, in the present embodiment, sensor electrode 112 is spaced apart from the edges of base material 111, and thus the possibility of occurrence of a disconnection or the like caused by sensor electrode 112 protruding from an edge of base material 111 can be suppressed.

As described above, detection circuit 120 is electrically connected to end a of first sensor electrode 112a and end b of second sensor electrode 112b via harness 130, and causes an electric current for detecting a contact by a hand of the driver to flow through first sensor electrode 112a and second sensor electrode 112b. Specifically, detection circuit 120 causes an alternating current to flow through, for example, each of first sensor electrode 112a and second sensor electrode 112b, and thereby measures a value corresponding to the capacitance of first sensor electrode 112a and a value corresponding to the capacitance of second sensor electrode 112b. Detection circuit 120 detects a contact on rim 201 of steering wheel 200 by a human hand based on the measured values. That is, detection circuit 120 detects a contact by a hand on a portion of rim 201 in which first sensor electrode 112a is disposed when the value measured for first sensor electrode 112a is greater than a threshold value. Likewise, detection circuit 120 detects a contact by a hand on a portion of rim 201 in which second sensor electrode 112b is disposed when the value measured for second sensor electrode 112b is greater than a threshold value.

Figure 9:
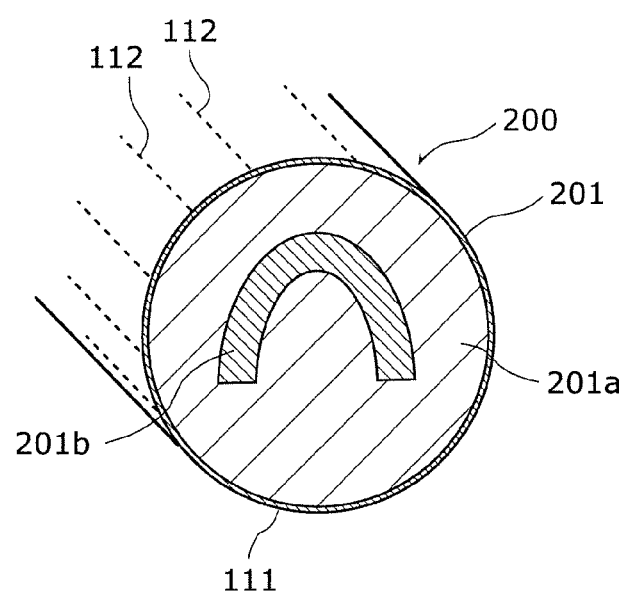
FIG. 9 is a diagram showing an example of a cross section of a rim to which an electrode unit according to Embodiment 2 is attached.

FIG. 9 is a diagram showing an example of a cross section of rim 201 to which electrode unit 110 is attached.

Rim 201 includes metal core 201b that is an annular core made of a metal and resin layer 201a that covers metal core 201b and is made of a urethane resin or the like.

Base material 111 of electrode unit 110 is wound around resin layer 201a such that the surface on which sensor electrode 112 is disposed faces toward resin layer 201a. Accordingly, sensor electrode 112 is covered by base material 111. The surface of wound base material 111 on which sensor electrode 112 is not disposed is covered by a surface layer made of leather, wood, resin, or the like.

Sensor electrode 112 provided on rim 201 in the manner as described above forms a capacitance between sensor electrode 112 and metal core 201b. The capacitance is relatively small. Here, when the portion of rim 201 in which sensor electrode 112 is disposed is held by a hand of the driver, a capacitance is also formed between sensor electrode 112 and the driver's hand. Accordingly, detection circuit 120 can detect the grip or contact on rim 201 by the hand based on a change in the measured capacitance of sensor electrode 112.

Figure 10:
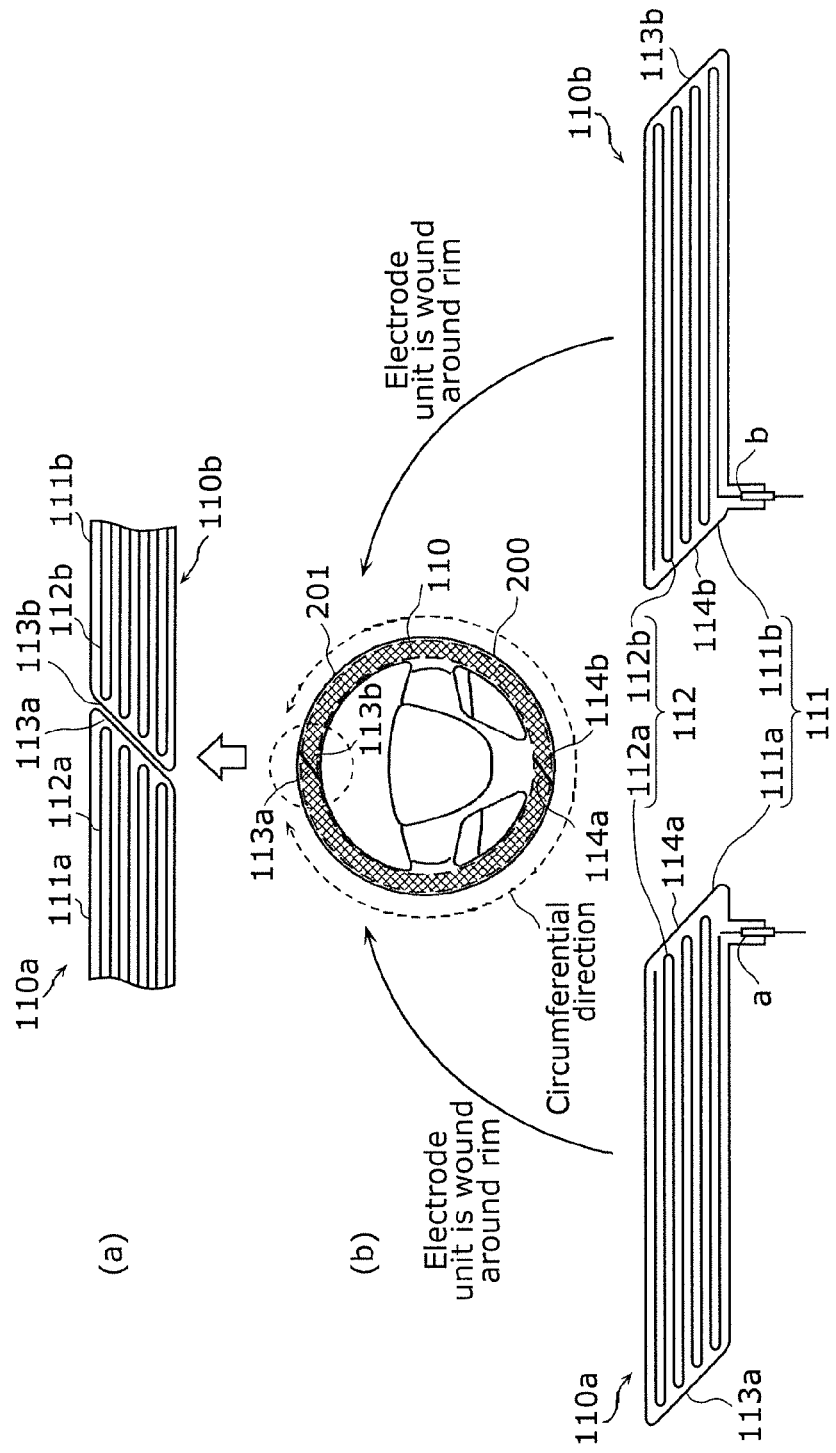
FIG. 10 is a diagram showing how the electrode unit according to Embodiment 2 is wound around the rim.

FIG. 10 is a diagram showing how electrode unit 110 is wound around rim 201. Specifically, (a) in FIG. 10 shows a state in which an end portion of first electrode unit 110a and an end portion of second electrode unit 110b are brought into abutment. (b) in FIG. 10 shows an example of how first electrode unit 110a and second electrode unit 110b are wound around rim 201.

For example, as shown in (b) in FIG. 10, first electrode unit 110a is wound on the left side of rim 201 of steering wheel 200 in neutral state. Likewise, second electrode unit 110b is wound on the right side of rim 201 of steering wheel 200 in neutral state. With this configuration, rim 201 is entirely covered by first electrode unit 110a and second electrode unit 110b. As used herein, the neutral state refers to a state of steering wheel 200 while vehicle 1 is moving straight ahead.

Accordingly, detection circuit 120 can separately detect a contact on the left side portion of rim 201 in which first electrode unit 110a is disposed and a contact on the right side portion of rim 201 in which second electrode unit 110b is disposed.

As described above, when electrode unit 110 is wound around rim 201, two end portions of base material 111 in the circumferential direction of rim 201 oppose each other.

Specifically, two end portions in the lengthwise direction of first base material 111a of first electrode unit 110a and two end portions in the lengthwise direction of second base material 111b of second electrode unit 110b oppose each other in the circumferential direction of rim 201. That is, leading end portion 113a of first base material 111a and leading end portion 113b of second base material 111b oppose each other in the circumferential direction of rim 201 at the upper end of rim 201 of the steering wheel in neutral state as shown in (a) in FIG. 10. Likewise, base end portion 114a of first base material 111a and base end portion 114b of second base material 111b oppose each other in the circumferential direction of rim 201 at the lower end of rim 201 of the steering wheel in neutral state.

Here, in the present embodiment, the edge of leading end portion 113a and the edge of base end portion 114a of first base material 111a are inclined as described above, and the edge of leading end portion 113b and the edge of base end portion 114b of second base material 111b are also inclined as described above. These edges are inclined in the same direction. By first electrode unit 110a and second electrode unit 110b configured as described above being wound around rim 201 as shown in FIG. 10, the probability of detection of a contact by a hand on the portion of rim 201 in which sensor electrode 112 is disposed can be increased. That is, the detection sensitivity to a contact can be increased.

Figure 11:
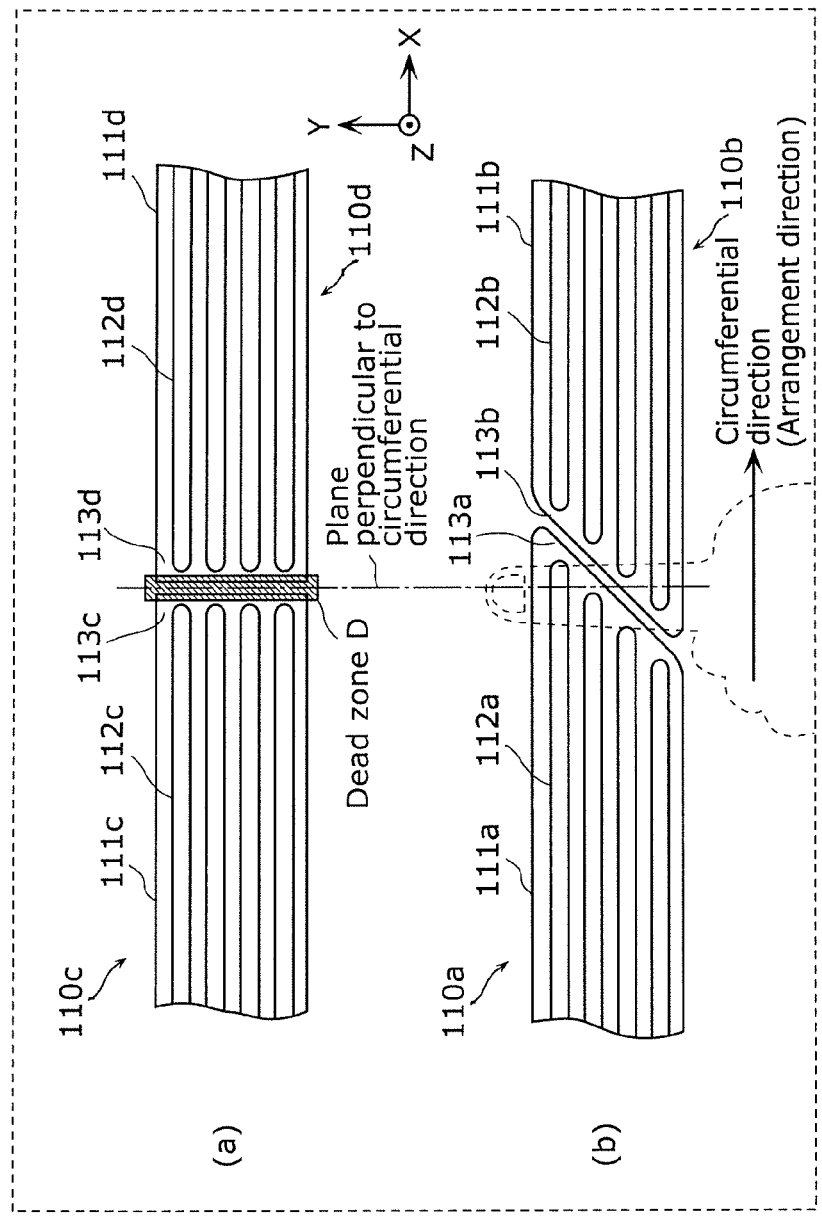
FIG. 11 is a diagram used to illustrate detection sensitivity in Embodiment 2.

FIG. 11 is a diagram used to illustrate detection sensitivity according to the present embodiment. Specifically, (a) in FIG. 11 shows a configuration of a portion of another steering wheel heater for comparison with steering wheel heater 100 of the present embodiment, and (b) in FIG. 11 shows a configuration of a portion of steering wheel heater 100 of the present embodiment.

For example, as shown in (a) in FIG. 1i, first electrode unit 110c and second electrode unit 110d that are different from electrode unit 110 of the present embodiment are wound around rim 201 as a comparative electrode unit for detection sensitivity. When first electrode unit 110c and second electrode unit 110d are wound around rim 201, leading end portion 113c of first base material 111c of first electrode unit 110c and leading end portion 113d of second base material 111d of second electrode unit 110d oppose each other in the circumferential direction of rim 201.

(a) in FIG. 11 shows a state of leading end portion 113c and leading end portion 113d when leading end portion 113c of first base material 111c and leading end portion 113d of second base material 111d that oppose each other are viewed from the front along an XY plane. The XY plane is a plane extending in the X axis direction and the Y axis direction that are perpendicular to each other, and the Z axis direction is a direction vertical to the XY plane. For example, the X axis direction is the arrangement direction of leading end portion 113c and leading end portion 113d, or the lengthwise direction of first base material 111c and second base material 111d. Likewise, the Y axis direction is the widthwise direction of first base material 111c and second base material 111d. The arrangement direction described above (or in other words, the X axis direction) corresponds to the circumferential direction of rim 201. Also, metal core 201b of rim 201 is provided in either one direction of the Z axis direction from first base material 111c and second base material 111d.

Here, as shown in (a) in FIG. 11, the edge of leading end portion 113c of first base material 111c of first electrode unit 110c and the edge of leading end portion 113d of second base material 111d of second electrode unit 110d are not inclined. That is, these edges are parallel to the widthwise direction of first base material 111c and second base material 111d (or in other words, the Y axis direction), and are perpendicular to the lengthwise direction of first base material 111c and second base material 111d (or in other words, the X axis direction). Accordingly, as described above, when first electrode unit 110c and second electrode unit 110d are wound around rim 201, dead zone D is formed between first sensor electrode 112c of first electrode unit 110c and second sensor electrode 112d of second electrode unit 110d. Dead zone D is a portion of rim 201 in which neither first sensor electrode 112c nor second sensor electrode 112d is disposed, and is formed along the boundary between leading end portion 113c of first base material 111c and leading end portion 113d of second base material 111d. In other words, dead zone D is formed along a line of intersection between the plane perpendicular to the circumferential direction of rim 201 at a position between leading end portions 113c and 113d and the surface of rim 201. Even when dead zone D is touched by a human hand, because first sensor electrode 112c and second sensor electrode 112d are not disposed in dead zone D, changes in the capacitances of first sensor electrode 112c and second sensor electrode 112d are small. As a result, it is not possible to accurately detect a contact by a hand.

For example, when the driver of vehicle 1 lightly touches the upper end portion of rim 201, it is relatively highly likely that the driver touches dead zone D but does not touch other portions of rim 201. Specifically, when the driver touches the upper end portion of rim 201, the driver touches the upper end portion of rim 201 with his/her forefinger, or holds the upper end portion of rim 201 with his/her forefinger and thumb. As described above, in the upper end portion of rim 201, the range that can be lightly touched by a human finger is a very small area in rim 201, and is often an area in rim 201 extending along a line of intersection between the plane perpendicular to the circumferential direction at the upper end portion and the surface of rim 201. Accordingly, dead zone D described above is likely to include the range that can be lightly touched by a human finger or the like, and thus the possibility that dead zone D in rim 201 is touched by a hand is high. As a result, with the steering wheel heater including first electrode unit 110c and second electrode unit 110d, the detection sensitivity at the upper end portion of rim 201 is low.

However, with steering wheel heater 100 of the present embodiment, the dead zone described above is displaced from the range that can be lightly touched by a human finger or the like. Specifically, as shown in (b) in FIG. 11, the edge of leading end portion 113a of first base material 111a of first electrode unit 110a is inclined, and the edge of leading end portion 113b of second base material 111b of second electrode unit 110b is also inclined.

As in (a) in FIG. 11, (b) in FIG. 11 shows a state of leading end portion 113a and leading end portion 113b when leading end portion 113a of first base material 111a and leading end portion 113b of second base material 111b that oppose each other are viewed from the front along the XY plane. For example, the X axis direction is the arrangement direction of leading end portion 113a and leading end portion 113b, or the lengthwise direction of first base material 111a and second base material 111b. Likewise, the Y axis direction is the widthwise direction of first base material 111a and second base material 111b. The arrangement direction described above (or in other words, the X axis direction) corresponds to the circumferential direction of rim 201. Also, metal core 201b of rim 201 is provided in either one direction of the Z axis direction from first base material 111a and second base material 111b. Hereinafter, FIGS. 12 to 14 each also show a state of leading end portion 113a and leading end portion 113b when leading end portion 113a and leading end portion 113b are viewed from the front along the XY plane, as in (b) in FIG. 11.

That is, in the present embodiment, as shown in (b) in FIG. 11, respective edges of two leading end portions 113a and 113b are adjacent and substantially parallel to each other, and are inclined relative to the Y axis direction. Accordingly, in the present embodiment, when first base material 111a and second base material 111b are attached to rim 201, the edges of two leading end portions 113a and 113b are inclined relative to the plane perpendicular to the circumferential direction of rim 201. As a result, sensor electrode 112 intersects a plane that is perpendicular to the circumferential direction of rim 201 and that crosses two leading end portions 113a and 113b. With this configuration, sensor electrode 112 can be disposed in the range that can be lightly touched by a human finger or the like. In other words, the dead zone can be inclined and displaced from that range.

Accordingly, in the present embodiment, even when the driver of vehicle 1 lightly touches the upper end portion of rim 201, the probability of detection of a contact by a hand on the portion of rim 201 in which sensor electrode 112 is disposed can be increased. As a result, the detection sensitivity of steering wheel heater 100, specifically, the detection sensitivity at the upper end portion of rim 201 can be improved.

Also, in the present embodiment, by simply forming two leading end portions 113a and 113b to have inclined edges, sensor electrode 112 can be easily disposed on base material 111 to intersect the above-described plane perpendicular to the circumferential direction. Accordingly, steering wheel heater 100 with high detection sensitivity can be easily produced. Also, the structure of leading end portions 113a and 113b is not complicated, and thus leading end portions 113a and 113b can be easily brought into proximity and oppose each other when attaching base material 111 to rim 201.

Base end portion 114a of first base material 111a and base end portion 114b of second base material 111b also oppose each other at the lower end portion of rim 201. The edges of base end portion 114a and 114b are also inclined in the same manner as the edges of leading end portions 113a and 113b. Accordingly, at the lower end portion of rim 201 as well, the dead zone is inclined and displaced from the range that can be lightly touched by a human finger or the like. Accordingly, in the present embodiment, even when the driver of vehicle 1 lightly touches the lower end portion of rim 201, the probability of detection of a contact by a hand on the portion of rim 201 in which sensor electrode 112 is disposed can be increased. As a result, the detection sensitivity of steering wheel heater 100, specifically, the detection sensitivity at the lower end portion of rim 201 can be improved.

Variation 1

In the embodiments described above, the edge of leading end portion 113a of first base material 111a and the edge of leading end portion 113b of second base material 111b are inclined, but the present disclosure is not limited to this configuration. In the present variation, leading end portion 113a of first base material 111a and leading end portion 113b of second base material 111b each have a protrusion and a recess, and the leading end portions oppose each other by engagement of the protrusions and the recesses.

Figure 12:
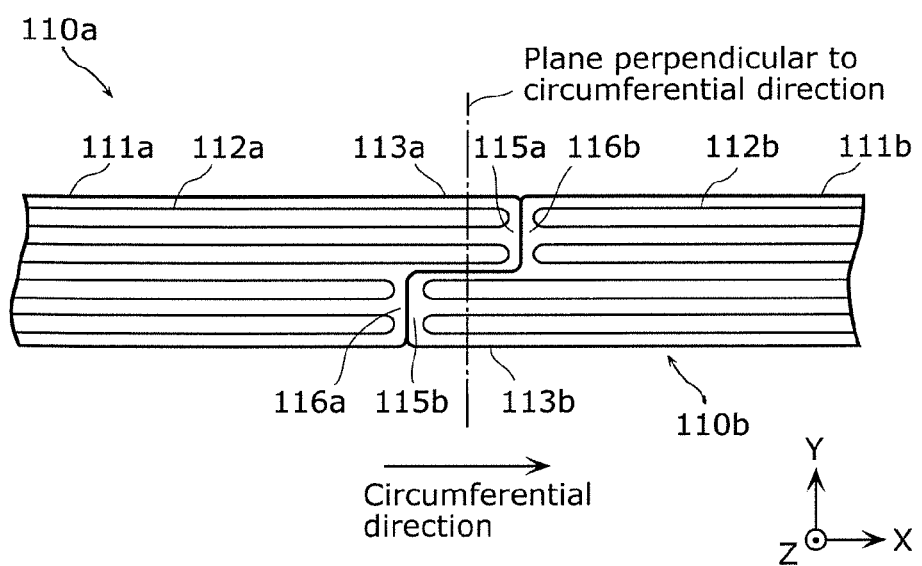
FIG. 12 is a diagram showing an example of a leading end portion of a first base material and a leading end portion of a second base material according to Variation 1 of Embodiment 2.

FIG. 12 is a diagram showing an example of leading end portion 113a of first base material 111a and leading end portion 113b of second base material 111b according to the present variation.

Leading end portion 113a of first base material 111a and leading end portion 113b of second base material 111b each have a protrusion and a recess as described above. Then, the protrusion and the recess of leading end portion 113a, which is one of two leading end portions 113a and 113b, are fitted to the recess and protrusion of leading end portion 113b, which is the other of two leading end portions 113a and 113b, in the circumferential direction of rim 201.

Specifically, leading end portion 113a of first base material 111a has protrusion 115a and recess 116a. Leading end portion 113b of second base material 111b also has protrusion 115b and recess 116b, as with leading end portion 113a of first base material 111a. The angle between protrusion 115a and 115b and the angle between recess 116a and 116b are substantially the right angle. That is, the edges of two leading end portions 113a and 113b are crank-shaped.

Also, a portion of first sensor electrode 112a is also disposed in protrusion 115a of leading end portion 113a of first base material 111a, and a portion of second sensor electrode 112b is also disposed in protrusion 115b of leading end portion 113b of second base material 111b. However, in the example shown in FIG. 12 as well, as in the embodiments described above, first sensor electrode 112a is disposed such that it does not extend to the edge of leading end portion 113a, or in other words, it does not extend to the edge of protrusion 115a and the edge of recess 116a, and thus first sensor electrode 112a is spaced apart from the edge of protrusion 115a and the edge of recess 116a. Likewise, second sensor electrode 112b is disposed such that it does not extend to the edge of leading end portion 113b, or in other words, it does not extend to the edge of protrusion 115b and the edge of recess 116b, and thus first sensor electrode 112b is spaced apart from the edge of protrusion 115b and the edge of recess 116b. With this configuration, the possibility of occurrence of a disconnection or the like caused by sensor electrode 112 protruding from an edge of base material 111 can be suppressed.

Protrusion 115a of leading end portion 113a of first base material 111a and recess 116b of leading end portion 113b of second base material 111b as described above are fitted to each other in the circumferential direction of rim 201. Likewise, recess 116a of leading end portion 113a of first base material 111a and protrusion 115b of leading end portion 113b of second base material 111b are fitted to each other in the circumferential direction of rim 201.

Even in the case of the example shown in FIG. 12, sensor electrode 112 intersects a plane that is perpendicular to the circumferential direction of rim 201 and that crosses two leading end portions 113a and 113b. Also, in the case of the example shown in FIG. 12, protrusion 115a and recess 116a of leading end portion 113a and protrusion 115b and recess 116b of leading end portion 113b are fitted, and thus leading end portions 113a and 113b can be positioned more accurately. As a result, sensor electrode 112 can be disposed to more appropriately intersect the above-described plane perpendicular to the circumferential direction.

Accordingly, in the example shown in FIG. 12 as well, as in the embodiments described above, even when the driver of vehicle 1 lightly touches the upper end portion of rim 201, the probability of detection of a contact by a hand on the portion of rim 201 in which sensor electrode 112 is disposed can be increased. As a result, the detection sensitivity of steering wheel heater 100, specifically, the detection sensitivity at the upper end portion of rim 201 can be improved.

Base end portion 114a of first base material 111a and base end portion 114b of second base material 111b may also have the same configuration as leading end portions 113a and 113b shown in FIG. 12. In this case, even when the driver of vehicle 1 lightly touches the lower end portion of rim 201, the probability of detection of a contact by a hand on the portion of rim 201 in which sensor electrode 112 is disposed can be increased. As a result, the detection sensitivity of steering wheel heater 100, specifically, the detection sensitivity at the lower end portion of rim 201 can be improved.

In the example shown in FIG. 12, the leading end portion of first base material 111a and the leading end portion of second base material 111b each have one protrusion and one recess, but may have more protrusions and more recesses.

Figure 13A:
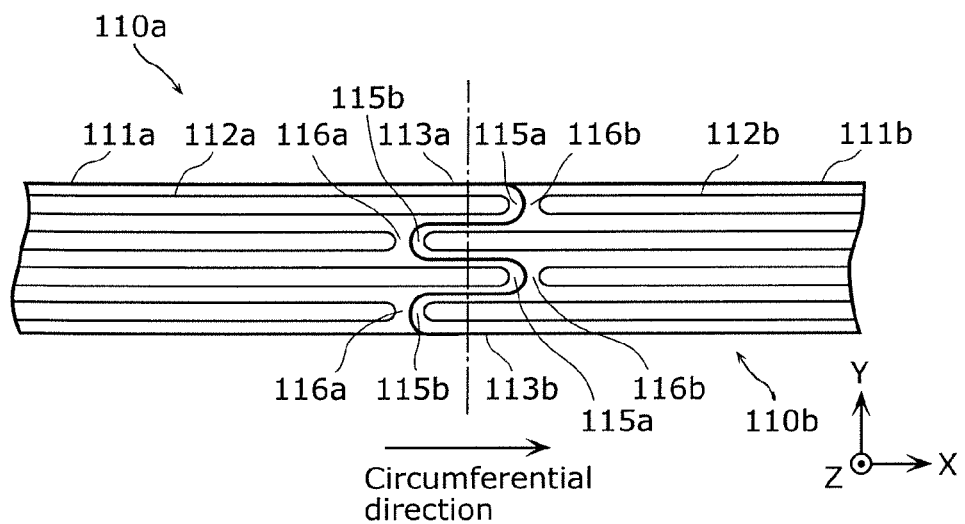
FIG. 13A is a diagram showing another example of a leading end portion of a first base material and a leading end portion of a second base material according to Variation 1 of Embodiment 2.

FIG. 13A is a diagram showing another example of leading end portion 113a of first base material 111a and leading end portion 113b of second base material 111b according to the present variation.

Leading end portion 113a of first base material 111a has a fork shape, and has a plurality of protrusions 115a and a plurality of recesses 116a. In the example shown in FIG. 13A, leading end portion 113a has two protrusions 115a and two recesses 116a. Leading end portion 113b of second base material 111b also has a fork shape, and has a plurality of protrusions 115b and a plurality of recesses 116b, as with leading end portion 113a of first base material 111a. In the example shown in FIG. 13A, leading end portion 113b has two recesses 116b and two protrusions 115b.

Also, a portion of first sensor electrode 112a is also disposed in two protrusions 115a of leading end portion 113a of first base material 111a, and a portion of second sensor electrode 112b is also disposed in two protrusions 115b of leading end portion 113b of second base material 111b. However, in the example shown in FIG. 13A as well, as in the embodiments described above, first sensor electrode 112a is disposed such that it does not extend to the edge of leading end portion 113a, or in other words, it does not extend to respective edges of two protrusions 115a and two recesses 116a, and thus first sensor electrode 112a is spaced apart from the edges of two protrusions 115a and two recesses 116a. Likewise, second sensor electrode 112b is disposed such that it does not extend to the edge of leading end portion 113b, or in other words, it does not extend to respective edges of two protrusions 115b and two recesses 116b, and thus second sensor electrode 112b is spaced apart from the edges of two protrusions 115b and two recesses 116b. With this configuration, the possibility of occurrence of a disconnection or the like caused by sensor electrode 112 protruding from an edge of base material 111 can be suppressed.

Two protrusions 115a of leading end portion 113a of first base material 111a and two recesses 116b of leading end portion 113b of second base material 111b as described above are fitted to each other in the circumferential direction of rim 201. Likewise, two recesses 116a of leading end portion 113a of first base material 111a and two protrusions 115b of leading end portion 113b of second base material 111b are fitted to each other in the circumferential direction of rim 201.

Even in the case of the example shown in FIG. 13A as described above, sensor electrode 112 intersects a plane that is perpendicular to the circumferential direction of rim 201 and that crosses two leading end portions 113a and 113b. Also, in the case of the example shown in FIG. 13A, two protrusions 115a and two recesses 116a of leading end portion 113a and two protrusions 115b and two recesses 116b of leading end portion 113b are fitted, and thus leading end portions 113a and 113b can be positioned more accurately. As a result, sensor electrode 112 can be disposed to more appropriately intersect the above-described plane perpendicular to the circumferential direction.

Accordingly, even in the example shown in FIG. 13A, as in the embodiments described above, even when the driver of vehicle 1 lightly touches the upper end portion of rim 201, the probability of detection of a contact by a hand on the portion of rim 201 in which sensor electrode 112 is disposed can be increased. As a result, the detection sensitivity of steering wheel heater 100, specifically, the detection sensitivity at the upper end portion of rim 201 can be improved.

Base end portion 114a of first base material 111a and base end portion 114b of second base material 111b may also have the same configuration as that of leading end portions 113a and 113b shown in FIG. 13A. In this case, even when the driver of vehicle 1 lightly touches the lower end portion of rim 201, the probability of detection of a contact by a hand on the portion of rim 201 in which sensor electrode 112 is disposed can be increased. As a result, the detection sensitivity of steering wheel heater 100, specifically, the detection sensitivity at the lower end portion of rim 201 can be improved.

Here, detection circuit 120 may cause electric currents in opposite directions to each other to flow through first sensor electrode 112a disposed in leading end portion 113a of first base material 111a and second sensor electrode 112b disposed in leading end portion 113b of second base material 111b.

Figure 13B:
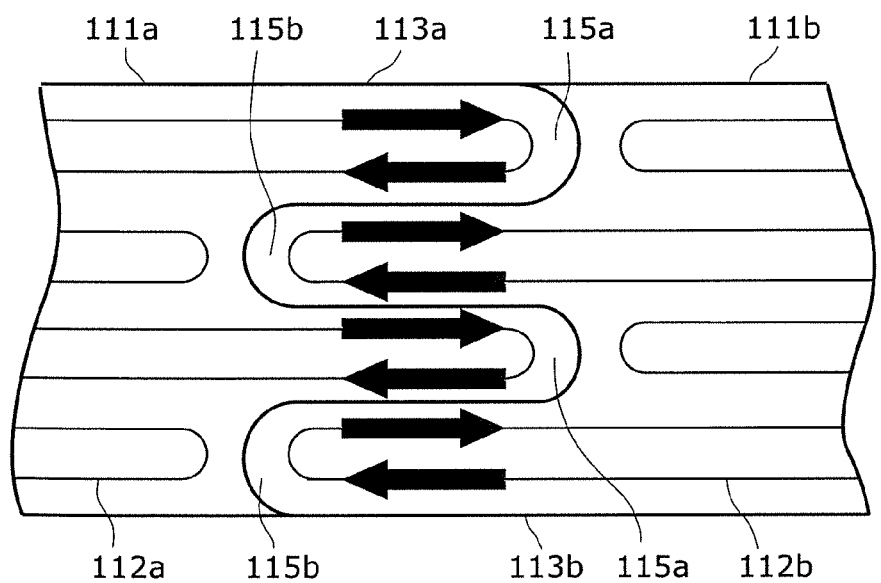
FIG. 13B is a diagram showing directions of electric currents flowing through a first sensor electrode and a second sensor electrode according to Variation 1 of Embodiment 2.

FIG. 13B is a diagram showing the directions of electric currents flowing through first sensor electrode 112a and second sensor electrode 112b.

For example, in each protrusion 115a of leading end portion 113a of first base material 111a, a portion having a substantially U shape of first sensor electrode 112a is disposed as a U-shaped portion. Furthermore, in each protrusion 115b of leading end portion 113b of second base material 111b as well, a portion having a substantially U shape of second sensor electrode 112b is disposed as a U-shaped portion. The U-shaped portion of first sensor electrode 112a and the U-shaped portion of second sensor electrode 112b are adjacent to each other. Specifically, a first linear portion included in the U-shaped portion of first sensor electrode 112a and a second linear portion included in the U-shaped portion of second sensor electrode 112b are disposed adjacent and substantially parallel to each other.

Detection circuit 120 of the present variation causes electric currents in opposite directions to each other to flow through the first linear portion included in the U-shaped portion of first sensor electrode 112a and the second linear portion included in the U-shaped portion of second sensor electrode 112b. With this configuration, an electromagnetic field generated at each U-shaped portion of first sensor electrode 112a and an electromagnetic field generated at each U-shaped portion of second sensor electrode 112b are cancelled, and thus the occurrence of noise can be suppressed.

As described above, in the present variation, detection circuit 120 causes electric currents in opposite directions to each other to flow through a first linear portion that is a portion of a conductive wire and is disposed in one of two leading end portions 113a and 113b and a second linear portion that is the other portion of the conductive wire, is disposed adjacent and substantially parallel to the first linear portion, and is disposed in the other of two leading end portions 113a and 113b. With this configuration, the occurrence of noise can be suppressed. In the example shown in FIG. 13A, the U-shaped portions of first sensor electrode 112a and the U-shaped portions of second sensor electrode 112b are alternately arranged in the Y axis direction, and thus a high noise reduction effect can be obtained.

Variation 2

The shape of leading end portion 113a of first base material 111a and the shape of leading end portion 113b of second base material 111b of the present disclosure are not limited to those of the embodiments and Variation 1 that were described above. In the present variation, leading end portion 113a of first base material 111a and leading end portion 113b of second base material 111b each have a slit, and the leading end portions oppose each other by engagement.

FIG. 14 is a diagram showing an example of leading end portion 113a of first base material 111a and leading end portion 113b of second base material 111b according to the present variation.

Two leading end portions 113a and 113b each have a slit that extends in the circumferential direction of rim 201, and are each divided by the slit into an electrode region in which a portion of sensor electrode 112 is disposed and an electrodeless region in which sensor electrode 112 is not disposed. When first base material 111a and second base material 111b are attached to rim 201, one of two leading end portions 113a and 113b is inserted into the slit formed in the other of two leading end portions 113a and 113b that is different from the one of two leading end portions 113a and 113b. Furthermore, each of the electrode regions of two leading end portions 113a and 113b is overlaid on the surface side of rim 201 relative to the electrodeless region of the other leading end portion.

Specifically, as shown in (a) in FIG. 14, leading end portion 113a of first base material 111a has slit 117a. Slit 117a is formed at substantially the center of first base material 111a in the widthwise direction (or in other words, the Y axis direction) so as to extend in the circumferential direction of rim 201. Leading end portion 113a is divided by slit 117a into electrode region 118a in which first sensor electrode 112a is disposed and electrodeless region 119a in which first sensor electrode 112a is not disposed.

Leading end portion 113b of second base material 111b also has slit 117b, as with leading end portion 113a of first base material 111a. Slit 117b is formed at substantially the center of second base material 111b in the widthwise direction (or in other words, the Y axis direction) so as to extend in the circumferential direction of rim 201. Leading end portion 113b is divided by slit 117b into electrode region 118b in which second sensor electrode 112b is disposed and electrodeless region 119b in which second sensor electrode 112b is not disposed.

Accordingly, in the present variation, first sensor electrode 112a is not disposed in a wide range of leading end portion 113a. First sensor electrode 112a is disposed only in electrode region 118a and is not disposed in electrodeless region 119a. Likewise, second sensor electrode 112b is not disposed in a wide range of leading end portion 113b. Second sensor electrode 112b is disposed only in electrode region 118b and is not disposed in electrodeless region 119b. However, in the example shown in FIG. 14 as well, as in the embodiments described above, first sensor electrode 112a is disposed such that it does not extend to the edge of electrode region 118a of leading end portion 113a, and first sensor electrode 112a is spaced apart from the edge of electrode region 118a. Likewise, second sensor electrode 112b is disposed such that it does not extend to the edge of electrode region 118b of leading end portion 113b, and second sensor electrode 112b is spaced apart from the edge of electrode region 118b. With this configuration, the possibility of occurrence of a disconnection or the like caused by sensor electrode 112 protruding from an edge of base material 111 can be suppressed.

When first base material 111a and second base material 111b as described above are wound around rim 201, leading end portion 113a of first base material 111a is inserted into slit 117b formed in leading end portion 113b of second base material 111b. Likewise, leading end portion 113b of second base material 111b is inserted into slit 117a formed in leading end portion 113a of first base material 111a.

As a result, as shown in (b) in FIG. 14, leading end portion 113a of first base material 111a and leading end portion 113b of second base material 111b are overlapped. Specifically, electrode region 118a of leading end portion 113a overlaps electrodeless region 119b of leading end portion 113b on the outer side (for example, the positive side of the Z axis direction, or in other words, the upper side) of electrodeless region 119b of leading end portion 113b. Conversely, electrodeless region 119a of leading end portion 113a overlaps electrode region 118b of leading end portion 113b on the inner side (for example, the negative side of the Z axis direction, or in other words, the lower side) of electrode region 118b of leading end portion 113b. Accordingly, leading end portion 113a of first base material 111a and leading end portion 113b of second base material 111b oppose each other in the Z axis direction.

Even in the present variation as described above, sensor electrode 112 intersects a plane that is perpendicular to the circumferential direction of rim 201 and that crosses two leading end portions 113a and 113b. Also, in the present variation, sensor electrode 112 can be easily disposed to intersect the above-described plane perpendicular to the circumferential direction without forming two leading end portions 113a and 113b to have an inclined edge or to have a protrusion and a recess.

Accordingly, in the present variation as well, as in the embodiments described above, even when the driver of vehicle 1 lightly touches the upper end portion of rim 201, the probability of detection of a contact by a hand on the portion of rim 201 in which sensor electrode 112 is disposed can be increased. As a result, the detection sensitivity of steering wheel heater 100, specifically, the detection sensitivity at the upper end portion of rim 201 can be improved.

In the present variation, the regions of leading end portion 113a and the regions of leading end portion 113b are overlapped, but first sensor electrode 112a and second sensor electrode 112b are not overlapped. With this configuration, it is possible to prevent a portion of rim 201 in which leading end portion 113a and leading end portion 113b are disposed to be inappropriately thicker than the other portion.

Base end portion 114a of first base material 111a and base end portion 114b of second base material 111b may also have the same configuration as that of leading end portions 113a and 113b shown in FIG. 14. In this case, even when the driver of vehicle 1 lightly touches the lower end portion of rim 201, the probability of detection of a contact by a hand on the portion of rim 201 in which sensor electrode 112 is disposed can be increased. As a result, the detection sensitivity of steering wheel heater 100, specifically, the detection sensitivity at the lower end portion of rim 201 can be improved.

Variation 3

In the embodiment and Variations 1 and 2 of the embodiments that were described above, steering wheel heater 100 detects a contact or grip on rim 201 of steering wheel 200 by a hand. In the present variation, the steering wheel heater not only functions to detect a contact or grip by a hand, but also functions as a heater for heating rim 201.

Figure 15:
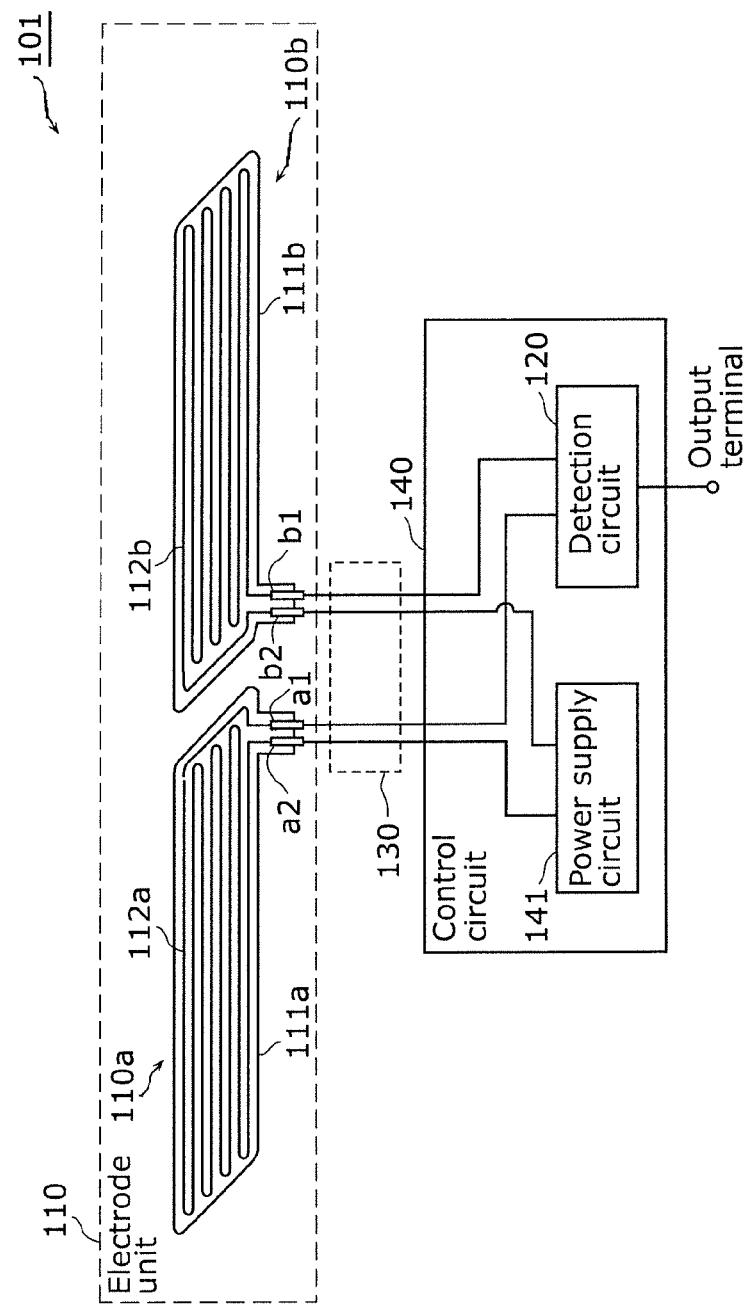
FIG. 15 is a diagram showing an example of a configuration of a steering wheel heater according to Variation 3 of Embodiment 2.

FIG. 15 is a diagram showing an example of a configuration of a steering wheel heater according to the present variation.

Steering wheel heater 101 includes electrode unit 110 and control circuit 140.

As in the embodiments described above, electrode unit 110 includes first electrode unit 110a and second electrode unit 110b. Two ends a1 and a2 of first sensor electrode 112a included in first electrode unit 110a are connected to control circuit 140 via harness 130. Likewise, two ends b1 and b2 of second sensor electrode 112b included in second electrode unit 110b are also connected to control circuit 140 via harness 130.

Control circuit 140 includes detection circuit 120 described above and power supply circuit 141. As in the embodiments and Variations 1 and 2 of the embodiments that were described above, detection circuit 120 detects a contact or grip to rim 201 by a human hand by causing an alternating current to flow through first sensor electrode 112a and second sensor electrode 112b. Power supply circuit 141 causes a direct current to flow through each of first sensor electrode 112a and second sensor electrode 112b so as to generate heat. As a result, power supply circuit 141 heats rim 201 of steering wheel 200.

A connection to the ground is made via an inductor (not shown) midway in wiring that electrically connects end a1 of first sensor electrode 112a and detection circuit 120 so as to cause an electric current to flow from power supply circuit 141 to first sensor electrode 112a. Likewise, a connection to the ground is made via an inductor (not shown) midway in wiring that electrically connects end b1 of second sensor electrode 112b and detection circuit 120 so as to cause an electric current to flow from power supply circuit 141 to second sensor electrode 112b.

In the present variation as described above, because rim 201 is heated, a person such as the driver of vehicle 1 can comfortably hold rim 201. In the example shown in FIG. 15, electrode unit 110 includes first electrode unit 110a and second electrode unit 110b of the embodiments described above, but may include first electrode unit 110a and second electrode unit 110b of Variation 1 or 2.

Embodiment 3

Unless otherwise stated, the configuration of steering wheel heater 11 according to the present embodiment is the same as that of Embodiment 1, and structural elements that are the same as those of Embodiment 1 are given the same reference numerals and a detailed description thereof will be omitted.

FIG. 16 is a diagram showing the states of an electrode unit (first electrode unit 110a and second electrode unit 110b) according to Embodiment 3 before and after it is wound around a rim.

As shown in FIG. 16, in first base material 311a and second base material 311b, a plurality of through holes 11a1 as those shown in Embodiment 1 are formed. First sensor electrode 112a is disposed in first base material 311a, and second sensor electrode 112b is disposed in second base material 311b.

In a state before the electrode unit is wound around the rim, a region between line V1 and line V2 is defined as a protruding region, line V1 being a line that passes through first portion B1 in which the angle between the edge of leading end portion 113a of first electrode unit 110a and the circumferential direction is obtuse and that is perpendicular to the circumferential direction of the rim, and line V2 being a line that passes through second portion B2 in which the angle between the edge of leading end portion 113b of second electrode unit 110b and the circumferential direction is obtuse and that is perpendicular to the circumferential direction of the rim. The protruding region is a region between line V1 and line V2. In a state before the electrode unit is wound around the rim, the length of the protruding region in the circumferential direction is slightly larger than, for example, a forefinger. In a state after the electrode unit has been wound around the rim, the length of the protruding region increases to be greater than that before the electrode unit is wound around the rim, and is slightly larger than a forefinger.

When first electrode unit 110a and second electrode unit 110b are wound around rim 201, first electrode unit 110a and second electrode unit 110b are stretched in the circumferential direction, and thus leading end portion 113a of first base material 111a and leading end portion 113b of second base material 111b are also stretched in the circumferential direction. In the present embodiment, a plurality of through holes 11a1 are formed in first base material 311a and second base material 311b, and thus first base material 311a and second base material 311b are easily stretched. That is, as compared with a first base material and a second base material in which a plurality of through holes 11a1 are not formed, first base material 311a and second base material 311b are stretched more significantly when first electrode unit 110a and second electrode unit 110b are wound around rim 201. Then, along with the stretching of first base material 311a and second base material 311b, first sensor electrode 112a disposed in leading end portion 113a and second sensor electrode 112b disposed in leading end portion 113b move in the circumferential direction.

Figure 17:
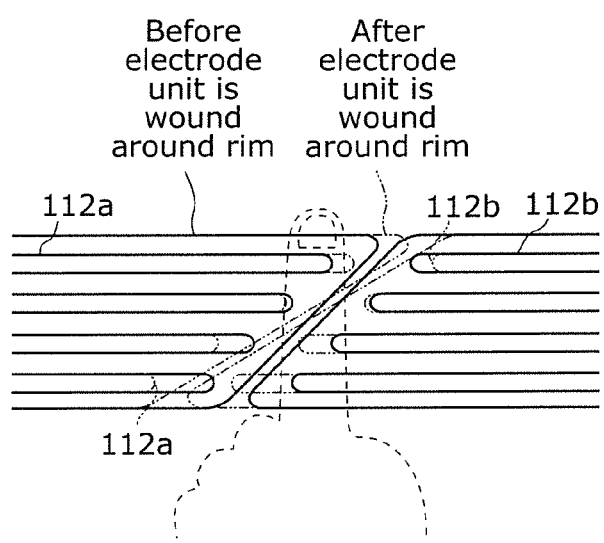
FIG. 17 is a diagram showing an example of an overlapping area of a finger with a first sensor electrode and a second sensor electrode before and after the electrode unit according to Embodiment 3 is wound around the rim.

In the state in which steering wheel heater 11 has been wound around rim 201, when a finger touches steering wheel heater 11 so as to extend across leading end portion 113a of first electrode unit 110a and leading end portion 113b of second electrode unit 110b, as shown in FIG. 17, the overlapping area of the finger with first sensor electrode 112a and second sensor electrode 112b increases. FIGS. 16 and 17 are diagrams showing an example of the overlapping area of the finger with first sensor electrode 112a and second sensor electrode 112b before and after the electrode unit of Embodiment 3 is wound around the rim. In FIG. 17, the dash double dotted line indicates a state after the electrode unit is wound around the rim, and the solid line indicates a state before the electrode unit is wound around the rim.

As shown in FIG. 17, looking at the overlap of the finger with first sensor electrode 112a and second sensor electrode 112b, the overlapping area of the finger with first sensor electrode 112a and second sensor electrode 112b indicated by the dash double dotted line showing a state after the electrode unit is wound around the rim is larger than that indicated by the solid line showing a state before the electrode unit is wound around the rim.

With steering wheel heater 11 as described above, first base material 311a and second base material 311b are easily stretched, and thus steering wheel heater 11 can be easily wound around rim 201 and workability is improved. Also, the overlapping area of the finger with first sensor electrode 112*a* and second sensor electrode 112*b* increases, and thus it is possible to reduce a region that serves as the dead zone in the boundary portion between leading end portion 113*a* and leading end portion 113*b*.

In particular, as in the present embodiment, in the case of the configuration in which leading end portion 113*a* and leading end portion 113*b* are inclined relative to the widthwise direction, when first base material 311*a* and second base material 311*b* are stretched in the tensile direction, leading end portion 113*a* and leading end portion 113*b* are also stretched in the tensile direction, as a result of which the protruding region can be enlarged. Accordingly, the detection sensitivity to a contact at the boundary portion between leading end portion 113*a* and leading end portion 113*b* can be enhanced.

Other Variations

Up to here, the steering wheel heater according to the present disclosure has been described by way of the embodiments given above, but the present disclosure is not limited to the embodiments. The present disclosure may also encompass embodiments obtained by making various types of modifications that can be conceived by a person having ordinary skill in the art to the above embodiments without departing from the scope of the present disclosure.

For example, in the steering wheel heater according to the embodiments given above, in a state in which the base material is wound around the steering wheel, the opening diameter of the plurality of through holes of the base material may be reduced from the outer circumferential side of the steering wheel toward the inner circumferential side of the steering wheel. Accordingly, the total opening area of the through holes per unit area in the base material on the outer circumferential side of the steering wheel is larger than the total opening area of the through holes per unit area in the base material on the inner circumferential side of the steering wheel.

For example, in the embodiments and the variations thereof that were described above, first sensor electrode 112*a* and second sensor electrode 112*b* are each made of a conductive wire such as a metal wire, but may be a so-called solid electrode. That is, first sensor electrode 112*a* and second sensor electrode 112*b* may be each made of a metal plate or a metal foil. In this case, first sensor electrode 112*a* and second sensor electrode 112*b* may be respectively joined to first base material 111*a* and second base material 111*b* by using an adhesive. The adhesive may be, for example, a double-sided adhesive tape or the like. Also, first sensor electrode 112*a* and second sensor electrode 112*b* may be disposed in a zigzag pattern, or may be disposed in any other pattern.

Also, in the embodiments and the variations thereof that were described above, base material 111 is composed of two base materials: first base material 111*a* and second base material 111*b*, but may be a single base material. In this case, base end portion 114*a* of first base material 111*a* and base end portion 114*b* of second base material 111*b* of the embodiments and the variations thereof that were described above are unitarily coupled. Also, the number of base materials included in electrode unit 110 may be two, three, or more. In this case, the end portions of adjacent base materials have the same configuration as that of the embodiments and the variations thereof that were described above, and are disposed in rim 201 such that they oppose each other.

Also, in Variation 1 described above, leading end portion 113*a* has protrusion 115*a* and recess 116*a*, and leading end portion 113*b* has protrusion 115*b* and recess 116*b*. However, the protrusions and the recesses may have any shape. For example, the protrusions may have a pointed shape. Also, in the example shown in FIG. 12, leading end portions 113*a* and 113*b* each have one protrusion and one recess, but may have a plurality of protrusions and a plurality of recesses. In this case as well, the edges of leading end portions 113*a* and 113*b* are crank-shaped. Also, in the example shown in FIG. 13A, leading end portions 113*a* and 113*b* each have two protrusions and two recesses, but may have three or more protrusions and three or more recesses.

Also, in the embodiments and the variations thereof that were described above, two end portions that oppose each other in base material 111 have a point symmetric shape as shown in FIGS. 11 to 14. However, in the present disclosure, the shape of two end portions is not limited to a point symmetric shape, and may be any shape.

Also, in the embodiments described above, base end portion 114*a* and 114*b* have the same configuration as that of leading end portions 113*a* and 113*b*, but base end portion 114*a* and 114*b* may have a configuration different from that of leading end portions 113*a* and 113*b*.

The present disclosure also encompasses embodiments obtained by making various types of modifications that can be conceived by a person having ordinary skill in the art to the above embodiments as well as embodiments implemented by any combination of the structural elements and the functions of the above embodiments without departing from the scope of the present disclosure.

While various embodiments have been described herein above, it is to be appreciated that various changes in form and detail may be made without departing from the spirit and scope of the present disclosure as presently or hereafter claimed.

Further Information about Technical Background to this Application

The present application is based on and claims priority of Japanese Patent Application No. 2019-011020 filed on Jan. 25, 2019, Japanese Patent Application No. 2019-049091 filed on Mar. 15, 2019, and Japanese Patent Application No. 2019-144383 filed on Aug. 6, 2019.

INDUSTRIAL APPLICABILITY

The steering wheel heater according to the present disclosure is applicable to, for example, a steering wheel for vehicles, a grip for motorbikes, or the like.

The invention claimed is:

1. A steering wheel heater, comprising:
   a base material that is wound around a steering wheel;
   a heater wire that generates heat by an electric current flowing through the heater wire; and
   a sewing thread that is used to sew the heater wire to one surface of the base material,
   wherein a plurality of through holes that have a diameter smaller than a sewing pitch of stitches of the sewing thread used to sew the heater wire are formed in the base material,
   wherein, in a state in which the base material is wound around the steering wheel, the plurality of through holes of the base material on an outer circumferential side of the steering wheel are greater in number than the plurality of through holes of the base material on an inner circumferential side of the steering wheel.

2. The steering wheel heater according to claim 1, further comprising:
   a control circuit that is electrically connected to one end of the heater wire, wherein the control circuit is electrically connected to the heater wire, and detects contact between a human body and the steering wheel by using the heater wire as a sensor electrode.

3. The steering wheel heater according to claim 2, wherein the base material is attached to a rim of the steering wheel to extend in a circumferential direction of the rim, two end portions of the base material in the circumferential direction of the rim oppose each other, and the sensor electrode is disposed on the base material to intersect a plane that is perpendicular to the circumferential direction of the rim and that crosses the two end portions.

4. The steering wheel heater according to claim 3, wherein the base material includes a first base material and a second base material, the sensor electrode includes a first sensor electrode that is disposed in the first base material and a second sensor electrode that is disposed in the second base material, one of the two end portions is an end portion of the first base material, and the other of the two end portions is an end portion of the second base material.

5. The steering wheel heater according to claim 3, wherein respective edges of the two end portions are inclined relative to the plane.

6. The steering wheel heater according to claim 3, wherein each of the two end portions has a protrusion and a recess, and the protrusion and the recess of one of the two end portions and the recess and the protrusion of the other of the two end portions are fitted in the circumferential direction.

7. The steering wheel heater according to claim 6, wherein each of the two end portions is fork-shaped and has a plurality of protrusions and a plurality of recesses.

8. The steering wheel heater according to claim 3, wherein each of the two end portions has a slit extending in the circumferential direction, and is divided by the slit into an electrode region in which a portion of the sensor electrode is disposed and an electrodeless region in which the sensor electrode is not disposed, and when the base material is attached to the rim, one of the two end portions is inserted into the slit of the other of the two end portions that is different from the one of the two end portions, and the electrode region of one of the two end portions is overlaid on a surface side of the rim relative to the electrodeless region of the other of the two end portions.

9. The steering wheel heater according to claim 3, wherein a circuit that causes the electric current to flow through the heater wire causes electric currents in opposite directions to each other to flow through a first linear portion and a second linear portion, the first linear portion being a portion of the heater wire and disposed in one of the two end portions, and the second linear portion being another portion of the heater wire, disposed adjacent and substantially parallel to the first linear portion, and disposed in the other of the two end portions.

10. A steering wheel heater, comprising:

a base material that is wound around a steering wheel;

a heater wire that generates heat by an electric current flowing through the heater wire; and a sewing thread that is used to sew the heater wire to one surface of the base material, wherein a plurality of through holes that have a diameter smaller than a sewing pitch of stitches of the sewing thread used to sew the heater wire are formed in the base material, and wherein a pitch between two adjacent through holes of the plurality of through holes is different from the sewing pitch.

11. A steering wheel heater, comprising:

a base material that is wound around a steering wheel;

a heater wire that generates heat by an electric current flowing through the heater wire; and a sewing thread that is used to sew the heater wire to one surface of the base material, wherein a plurality of through holes that have a diameter smaller than a sewing pitch of stitches of the sewing thread used to sew the heater wire are formed in the base material, and wherein, in a state in which the base material is wound around the steering wheel, a first number density of the through holes per unit area of the base material on an outer circumferential side of the steering wheel is larger than a second number density of the through holes per unit area of the base material on an inner circumferential side of the steering wheel.

* * * * *